US011507697B2

(12) United States Patent
Atreya et al.

(10) Patent No.: US 11,507,697 B2
(45) Date of Patent: *Nov. 22, 2022

(54) SYSTEMS AND METHODS FOR DEFINING AND SECURELY SHARING OBJECTS IN PREVENTING DATA BREACH OR EXFILTRATION

(71) Applicant: Digital Guardian LLC, Waltham, MA (US)

(72) Inventors: Shreemathi Atreya, Cupertino, CA (US); Niranjan Koduri, Pleasanton, CA (US); Wai Tung Yim, San Jose, CA (US); Emanoel Daryoush, San Jose, CA (US)

(73) Assignee: Digital Guardian LLC, Waltham, MA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/068,460

(22) Filed: Oct. 12, 2020

(65) Prior Publication Data

US 2021/0026992 A1 Jan. 28, 2021

Related U.S. Application Data

(63) Continuation of application No. 15/879,588, filed on Jan. 25, 2018, now Pat. No. 10,803,204.

(51) Int. Cl.
*H04L 29/06* (2006.01)
*G06F 21/64* (2013.01)
(Continued)

(52) U.S. Cl.
CPC .............. *G06F 21/64* (2013.01); *G06F 21/10* (2013.01); *G06F 21/556* (2013.01);
(Continued)

(58) Field of Classification Search
CPC ... H04L 63/10; H04L 63/123; G06F 21/6218; G06F 21/64; G06F 21/10; G06F 21/556
(Continued)

(56) References Cited

U.S. PATENT DOCUMENTS 6,742,121 B1 5/2004 Safadi
8,131,281 B1 3/2012 Hildner et al.
(Continued)

OTHER PUBLICATIONS

Foreign Search Report on PCT PCT/US2019/015001 dated Jun. 24, 2019.
(Continued)

*Primary Examiner* — Amare F Tabor
(74) *Attorney, Agent, or Firm* — Fredrikson & Byron, P.A.

(57) ABSTRACT

Provided herein are systems and methods for defining and securely sharing objects for use in preventing data breach or exfiltration. Memory may be configured to store a plurality of objects for use in preventing data breach or exfiltration. A validation engine can validate the objects, incorporate into each object an object identifier and a signature, and generate a subset of the objects for use by a first user. The validation engine can store, in the memory, the plurality of objects as a superset of objects corresponding to the generated subset. An evaluation engine may, responsive to identifying that one or more object identifiers and signatures in a received set of objects belong to the subset corresponding to the stored superset, verify whether any object in the received set has been tampered with.

20 Claims, 8 Drawing Sheets

(51) Int. Cl.
    *G06F 21/10*     (2013.01)
    *H04L 9/40*     (2022.01)
    *G06F 21/62*     (2013.01)
    *G06F 21/55*     (2013.01)

(52) U.S. Cl.
    CPC .......... *G06F 21/6218* (2013.01); *H04L 63/10* (2013.01); *H04L 63/123* (2013.01)

(58) Field of Classification Search
    USPC ..................................................... 726/27, 28
    See application file for complete search history.

(56) References Cited

U.S. PATENT DOCUMENTS

| | | |
|---|---|---|
| 8,677,505 B2 | 3/2014 | Redlich et al. |
| 8,793,804 B2 | 7/2014 | Bekker et al. |
| 9,591,023 B1 | 3/2017 | McClintock et al. |
| 9,747,446 B1 | 8/2017 | Pidathala et al. |
| 9,979,740 B2 | 5/2018 | Christian |
| 10,326,778 B2 | 6/2019 | Gong et al. |
| 2016/0057507 A1 | 2/2016 | McKenna |
| 2016/0277360 A1 | 9/2016 | Dwyier et al. |
| 2018/0150647 A1 | 5/2018 | Naqvi et al. |
| 2019/0356691 A1* | 11/2019 | El-Moussa .......... H04L 63/1416 |

OTHER PUBLICATIONS

International Preliminary Report of Patentability on PCT PCT/US2019/015001 dated Aug. 6, 2020.
Non-Final Office Action on U.S. Appl. No. 15/879,588 dated Nov. 1, 2019.
Notice of Allowance on U.S. Appl. No. 15/879,588 dated Feb. 11, 2020.
Notice of Allowance on U.S. Appl. No. 15/879,588 dated Jun. 1, 2020.

* cited by examiner

SYSTEMS AND METHODS FOR DEFINING AND SECURELY SHARING OBJECTS IN PREVENTING DATA BREACH OR EXFILTRATION

CROSS-REFERENCE TO RELATED APPLICATIONS

The present application claims priority under 35 U.S.C. § 120 as a continuation application of U.S. patent application Ser. No. 15/879,588, titled "Systems and Methods for Defining and Securely Sharing Objects in Preventing Data Breach or Exfiltration," filed Jan. 25, 2018, which is incorporated herein by reference in its entirety.

TECHNICAL FIELD

The present application relates generally to systems and methods for data loss prevention, including but not limited to systems and methods for security sharing objects for use in preventing data breach or exfiltration.

BACKGROUND

In a computing environment, certain applications or a user may attempt to access or misuse data stored in a computing environment. A subset of the data may contain sensitive or confidential information. The exfiltration or misuse of such data may compromise the computing environment and/or the very data assets themselves. Current techniques for identifying data containing sensitive or confidential information are not sufficiently accurate. In addition, definitions for identifying sensitive or confidential information may be exposed, allowing alteration by entities with malicious intent or by mistake.

SUMMARY

Described herein are systems and methods for classifying content to prevent data breach or exfiltration (e.g., opening, storing, downloading, uploading, movement). Various predefined definitions or objects can be used to identify sensitive or confidential information, and such definitions or objects may be included in software packages or software development kits that can be applied to a particular computing or networked environment. Various versions or variants of such definitions or objects may be developed and defined, and can interoperate or combine with other software objects or components for internal validation, and then extracted or customized into software packages/kits that are delivered for external deployment for instance. Copies of the predefined definitions or objects can be maintained or stored internally, so that certain scenarios or purported issues with a certain software package that are encountered externally, can be reproduced and evaluated internally. Certain aspects of the present solution allow for validation of definitions or objects in a deployed software package, so as to detect possible tampering or inadvertent change that would cause a mismatch between objects/definitions that are maintained internally and those that are deployed externally.

Data breach or exfiltration in computing environments can occur in many ways. For example, various applications (e.g., web browsers, electronic mail applications, document processing applications, facsimile or printing applications, file/data transfer applications, and cloud storage applications), background system services (e.g., copy and paste operation, screenshot acquisition, and connection of removable computer storage), and/or other processes of a computing environment may attempt to access data. Such data may include document files, data strings, images, audio, or any other file format of data stored in the computing environment. A subset or constituent portion of the data may correspond to sensitive or confidential information, such as personal or security identifiers (e.g., account identifier, phone numbers, license plate numbers, birthdate, credit card numbers).

Such information may be identified as sensitive or confidential on a word-by-word or a phrase-by-phrase comparison with entries of a dictionary. The dictionary may correspond to one or more predefined definitions or objects, that can be included in into a software package/kit. The dictionary can include a large set of words or phrases marked as sensitive or confidential. Each entry may include a template of the word to account for slight variations (e.g., spacing, capitalization, plural form). Each word of a file may be compared against all the entries of the dictionary to determine whether the file contains sensitive or confidential information, such as personal identifiers. Without incorporating context or using other logic, however, such techniques may be inaccurate and may result in false positives for data breach/exfiltration/misuse. Thus many of the data breaches and exfiltration attempts by or using applications from the computing environment may be carried out undetected.

To increase the accuracy of identifying data as containing classified or sensitive information, an entity engine executable in the computing environment may classify content into various content types by applying a set of predefined entity definitions. The entity engine and/or entity definitions may correspond to predefined definition(s) or object(s) that can be included in into a software package/kit. Each entity definition may include a combination of a regular expression, a set of terms, and/or a set of dictionary entries, among others for a particular content type (e.g., account identifier, phone numbers, license plate numbers, birthdate, credit card numbers). Various versions (e.g., customized or upgraded versions) of an entity definition may be stored individually or in separate sets of entity definitions.

Using the set of predefined entity definitions, the entity engine may classify the content into one of various content types, e.g., types of personal identifiers. The content can be classified to have a content type identified as containing sensitive or confidential information. The entity engine may for example identify activities corresponding to the data type, that are considered to be unauthorized or relate to data misuse/breach/exfiltration, and can prevent such unauthorized access or exfiltration of the content by any user or application running in the computing environment.

Some definitions/objects for identifying confidential or sensitive information contained in content may be accessible by end users of clients via a development platform or software package (e.g., software development kit (SDK)). With the use of the development platform or the software package, other components such as internal definitions and implementations details can be hidden from the end users. The development platform may also prevent tampering of entity definitions and may allow for version control, upgrades, and/or passing of metadata related to the entity definitions to the end user. In the development platform, entity definitions for identifying confidential or sensitive information may be specified using objects (e.g., variables, data structures, functions, class definitions). A subset of such objects may be provided by default from a platform server associated with the development platform. The predefined objects may be provided as part of a library of entity definitions, and may be maintained and updated from the platform server. Another subset of these objects may be created and specified by the end user, and may be shared with other end users of the development platform. For instance, user-specified objects and/or predefined objects may be used separately or mixed according to customer (or client system) scenarios. A predefined object can be customized, e.g., externally by a customer, and the customization may be indicated in one or more properties of the customized object (e.g., signature and/or identifier). Various versions (e.g., customized or upgraded versions) of a predefined object may be stored individually or in separate sets of objects.

In some embodiments, to prevent the end user defined objects (or end user) from altering predefined objects for use in identifying confidential or sensitive information in content, or to detect the possibility of such occurrence, a validation engine may apply a schema validation on the predefined objects on the server-side and/or the client-side. There may be a separate predefined internal schema on the server-side and a predefined schema on the client-side for predefined objects, for schema generation and/or validation. Schema validation may prevent tampered or altered objects from passing off as predefined objects. Each schema may specify one or more parameters for the predefined entity definitions. Based on the predefined internal schema on the server-side, the validation engine may generate a set of objects associated with the predefined entity definitions. In generating each object in the set, the validation engine may create an identifier and a signature for the object. The identifier may be used to associate with the end user defined object. The signature may define inputs, outputs, and other definition parameters of the object. The set of objects generated using the predefined internal schema may be encrypted, stored, and maintained on a database at the server.

From the predefined internal set of objects, the validation engine may generate a predefined external set of objects for deployment on a particular computing environment, networked environment or platform (sometimes generally referred to as a "client system"). The predefined external set may include a subset of the predefined objects and may contain less information regarding the entity definitions than the predefined internal set. For instance, certain information (e.g., some portion of a predefined definition) or implementation details of a predefined object may be considered intellectual property to be hidden (e.g., as trade secret) from customers or end-users, and providing a subset of the objects would provide them with the flexibility to use a portion of the predefined internal set. The information included with the predefined external set may include the name, description, identifier, signature, and/or other metadata for the object. Internal implementation details, such as internal services, encryption type, and some of the metadata, may be stripped from the information for the predefined external set of objects. The predefined external set provided to the client may constitute a subset of the predefined internal set of objects maintained at the server.

At the client system, the end user may define new objects or modify/customize/upgrade the predefined objects for additional entity definitions to identify sensitive or confidential information in content within the computing environment. New objects defined by the new user may be added to the predefined external set of objects. This allows for extensibility of the predefined objects. To verify or detect if any from the predefined set of objects has been tampered, an evaluation engine may compare the identifiers and signatures of the predefined external set of objects at the client with the corresponding identifiers and signatures of the predefined internal set of objects at the server. If any of the corresponding identifiers and signatures differ, the evaluation engine may determine that the predefined external set of objects has been tampered/modified by the end user. Conversely, if all the corresponding identifiers and the signatures match, the evaluation engine may determine that the predefined external set of objects has not been tampered/modified. Based on the determination, the evaluation engine may then proceed to analyze content within the computing environment using the predefined internal set of objects and/or the newly defined objects to identify any confidential or sensitive information in the content. For instance, the evaluation engine may analyze the content separately using the predefined internal set of objects, and using the newly defined objects, for comparison or benchmarking purposes. Or the evaluation engine may analyze the content separately using the predefined internal set of objects (e.g., for issue replicating, debugging or evaluation purposes, in connection with sensitive data policy violations for instance), if it is determined that no modification/tampering of the external set of objects has been detected. Additionally or alternatively, schema validation may prevent tampered or altered objects from passing off as predefined objects.

At least one aspect of the present disclosure is directed to a system for defining and securely sharing objects for use in preventing data breach, misuse or exfiltration. The system may include memory for storing or maintaining related information or resources. The memory may store a plurality of objects for use in preventing data breach or exfiltration. The system may include a validation engine executable on one or more processors. The validation engine may validate the plurality of objects for use in preventing data breach or exfiltration. The validation engine may incorporate, into each respective object of the plurality of objects, an object identifier and a signature for the respective object. The signature (and/or object identified) may be designed and/or used for version control, and updated according to every change made to the respective object. The validation engine may generate a subset of the plurality of objects for use by a first user in managing data loss prevention. Each object in the subset may maintain the corresponding object identifier and signature. The validation engine may store, in the memory, the plurality of objects as a superset of objects corresponding to the generated subset. The system may include an evaluation engine executable on the one or more processors. The evaluation engine may, responsive to identifying that one or more object identifiers and signatures in a received set of objects belong to the subset of objects corresponding to the stored superset, verify whether any object in the received set has been tampered with, by checking whether each object identifier and signature of each object in the received set matches that of a corresponding object in the stored superset. The received set of objects may be accompanied with content to be evaluated. The evaluation engine may evaluate the content using the stored superset of objects, responsive to verifying that none of the objects in the received set has been tampered with.

In some embodiments, the memory may store a plurality of supersets of objects corresponding to a plurality of subsets of objects. Each of the subsets may have at least one object identifier or signature different from those of another of the subsets. In some embodiments, each object of the plurality of objects may include a pattern, a term, a dictionary of words or phrases, an entity definition, or a classifier. In some embodiments, the signature of a corresponding object may include a signature corresponding to a most recent update made to the corresponding object.

In some embodiments, the validation engine may incorporate, into each respective object of the plurality of objects, a status of the respective object. In some embodiments, the validation engine may incorporate, into each respective object of the plurality of objects, metadata of the respective object, which includes the status and/or test data. The status of an object may include test data, e.g., unit test data provided by a creator/developer for the object. In some embodiments, the status of the respective object may include an indication of at least one of: whether the respective object is ready to be published for usage, whether the respective object is still in development, whether the respective object is deprecated, whether the respective object can be visible in a user interface or otherwise exposed or made accessible/readable to a user, whether the status is for internal use, or whether the status is for external use or can be published In some embodiments, the validation engine may generate the subset of the plurality of objects by at least one of: removing or hiding (e.g., making non-visible or non-readable to a user) at least a portion of an object to be included in the subset. In some embodiments, the evaluation engine may check that each object identifier and signature of each object in the received set matches that of a corresponding object in the retrieved superset, before evaluating the content.

In some embodiments, the evaluation engine may, responsive to detecting that a signature of a first object in the received set does not match that of a corresponding object in the retrieved superset, determine that the first object has been tampered with since the generation of the subset. In some embodiments, the evaluation engine may detect an issue or potential issue in the operation of the superset of objects during evaluation of the content.

At least one aspect of the present disclosure is directed to a method of defining and securely sharing objects for use in preventing data breach or exfiltration. The method may include validating, by a validation engine executable on one or more processors, a plurality of objects for use in preventing data breach or exfiltration. The method may include incorporating, by the validation engine into each respective object of the plurality of objects, an object identifier and a signature for the respective object. The method may include generating, by the validation engine, a subset of the plurality of objects for use by a first user in managing data loss prevention. Each object in the subset may maintain the corresponding object identifier and signature. The method may include storing, by the validation engine in memory, the plurality of objects as a superset of objects corresponding to the generated subset. The method may include retrieving, by an evaluation engine executing on the one or more processors, the superset of objects from the memory, responsive to identifying that one or more object identifiers and signatures in a received set of objects belong to the subset of objects corresponding to the superset, the received set of objects accompanied with content to be evaluated. The method may include evaluating, by the evaluation engine, the content using the stored superset of objects, responsive to verifying that none of the objects in the received set has been tampered with.

In some embodiments, the method may include storing, in the memory, a plurality of supersets of objects corresponding to a plurality of subsets of objects. Each of the subsets may have at least one object identifier or signature different from those of another of the subsets. In some embodiments, each object of the plurality of objects may include a pattern, a term, a dictionary of words or phrases, an entity definition, or a classifier. In some embodiments, the signature of a corresponding object may include a signature corresponding to a most recent update made to the corresponding object.

In some embodiments, the method may include incorporating, by the validation engine into each respective object of the plurality of objects, a status of the respective object. In some embodiments, the status of the respective object may include an indication of at least one of: whether the respective object is ready to be published for usage, whether the respective object is still in development, whether the respective object is deprecated, whether the respective object can be visible in a user interface, whether the status is for internal use, or whether the status is for external use or can be published.

In some embodiments, generating the subset of the plurality of objects may include at least one of: removing or hiding at least a portion of an object to be included in the subset. In some embodiments, the method may include checking, by the evaluation engine, that each object identifier and signature of each object in the received set matches that of a corresponding object in the retrieved superset, before evaluating the content.

In some embodiments, the method may include detecting, by the evaluation engine, that a signature of a first object in the received set does not match that of a corresponding object in the retrieved superset, and determining that the first object has been tampered with since the generation of the subset. In some embodiments, the method may include detecting, by the evaluation engine, an issue or potential issue in the operation of the superset of objects during evaluation of the content.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for classifying content to prevent data breach or exfiltration. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for classifying content to prevent data breach or exfiltration.

Second C describes systems and methods for defining and securely sharing objects for use in preventing data breach or exfiltration.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Figure 1A:
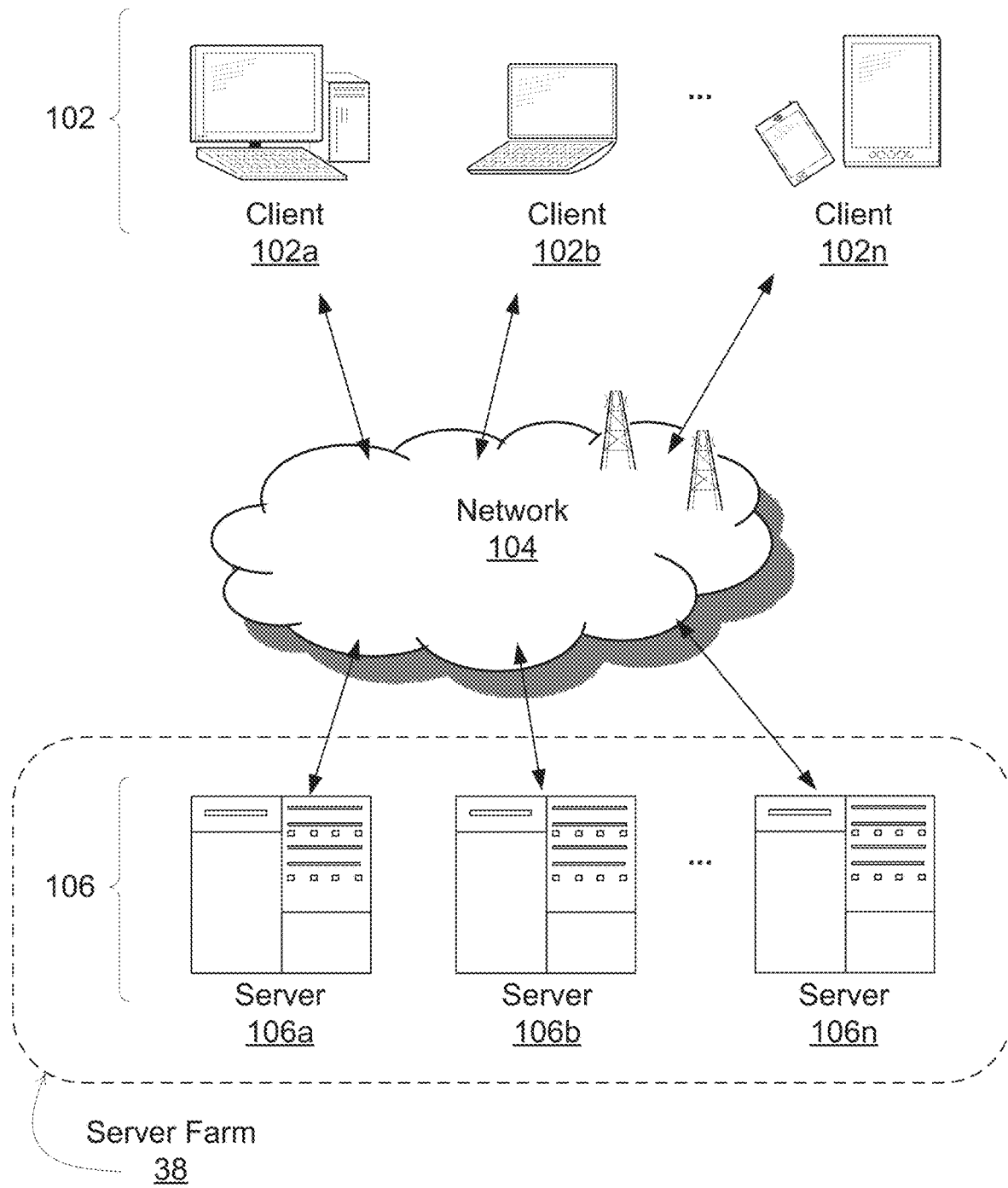
FIG. 1A is a block diagram depicting an embodiment of a network environment comprising client devices in communication with server devices.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALB OX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
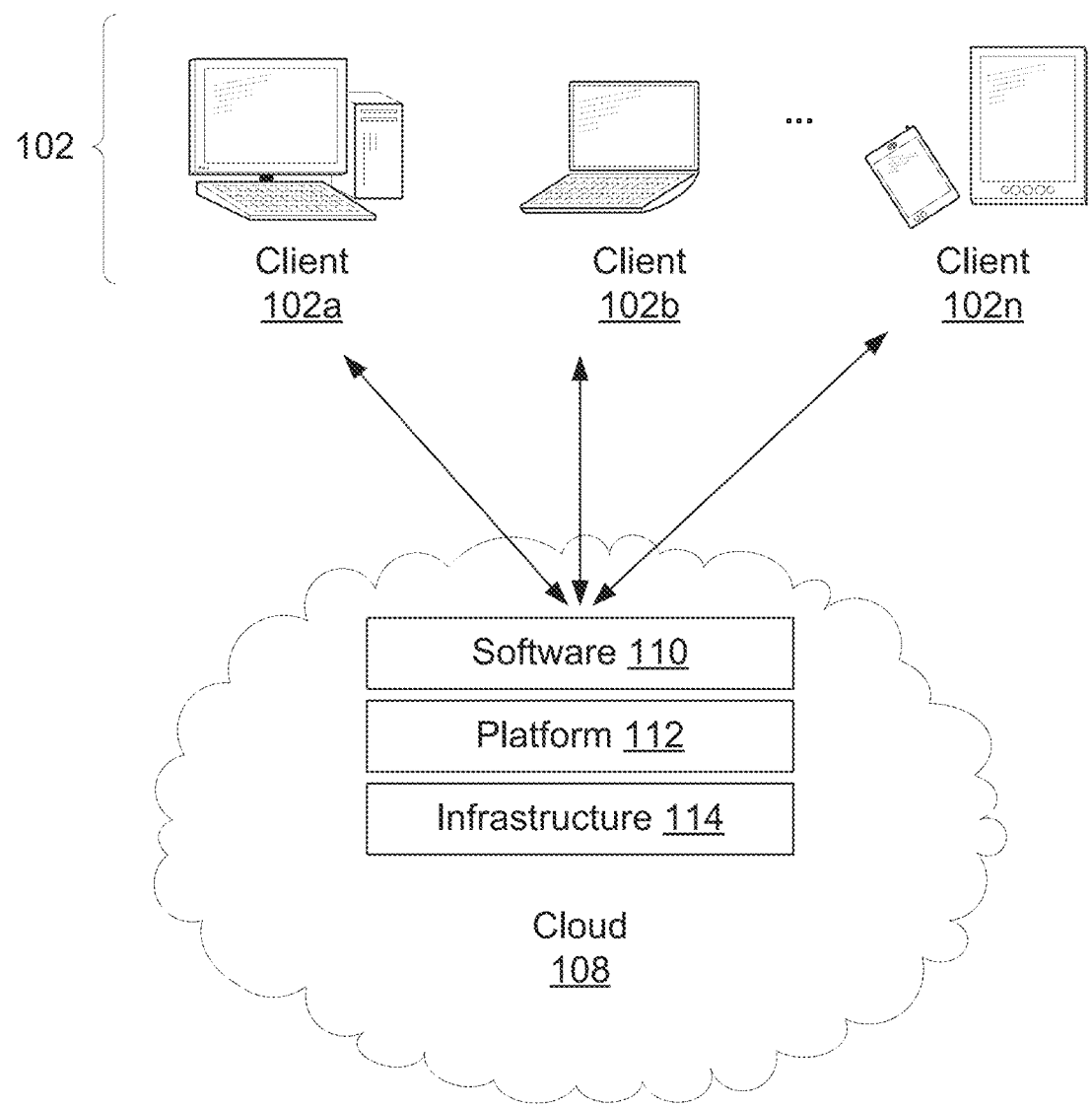
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
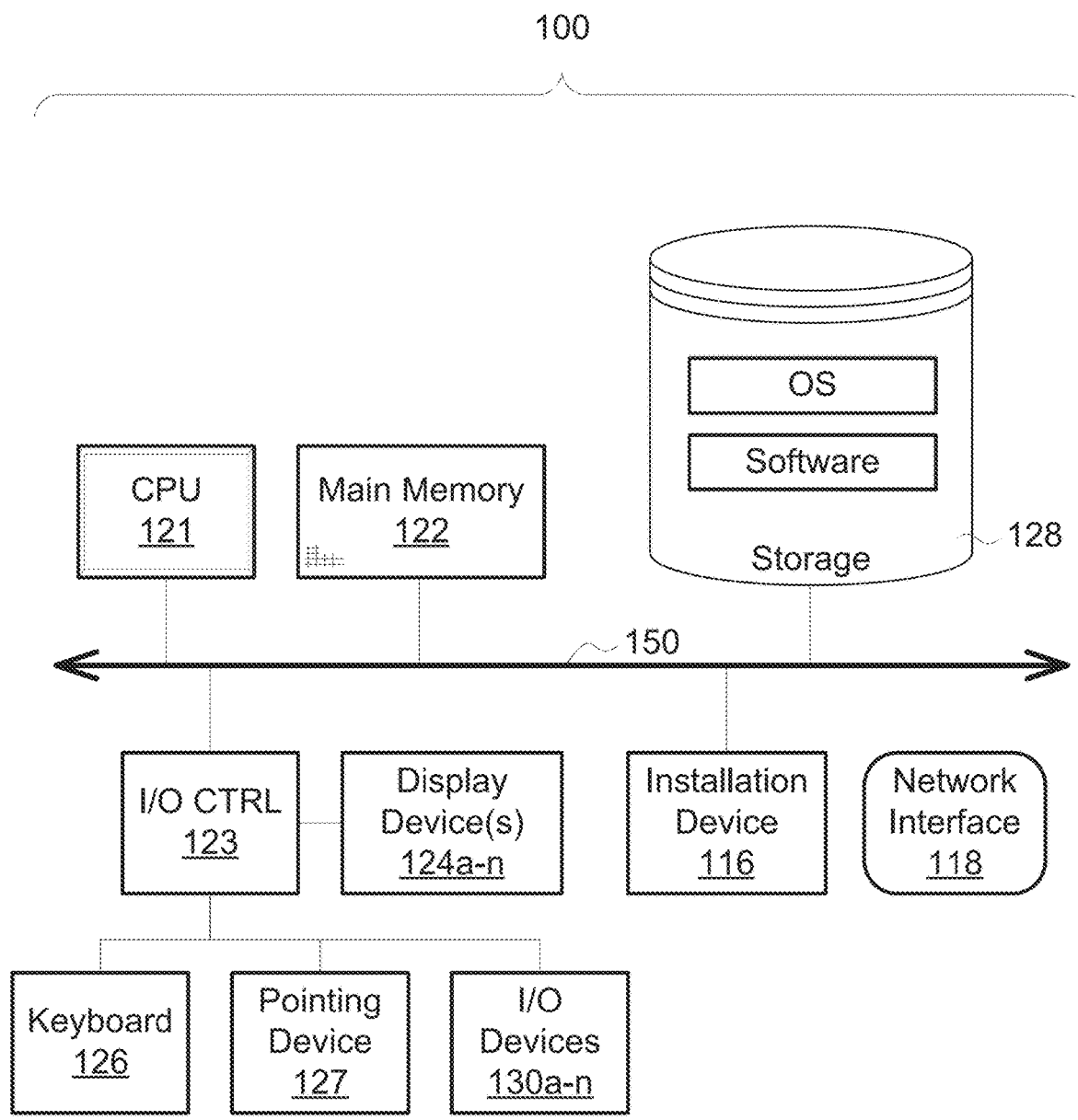
FIGS. 1C and 1D are block diagrams depicting embodiments of computing devices useful in connection with the methods and systems described herein.
Figure 1D:
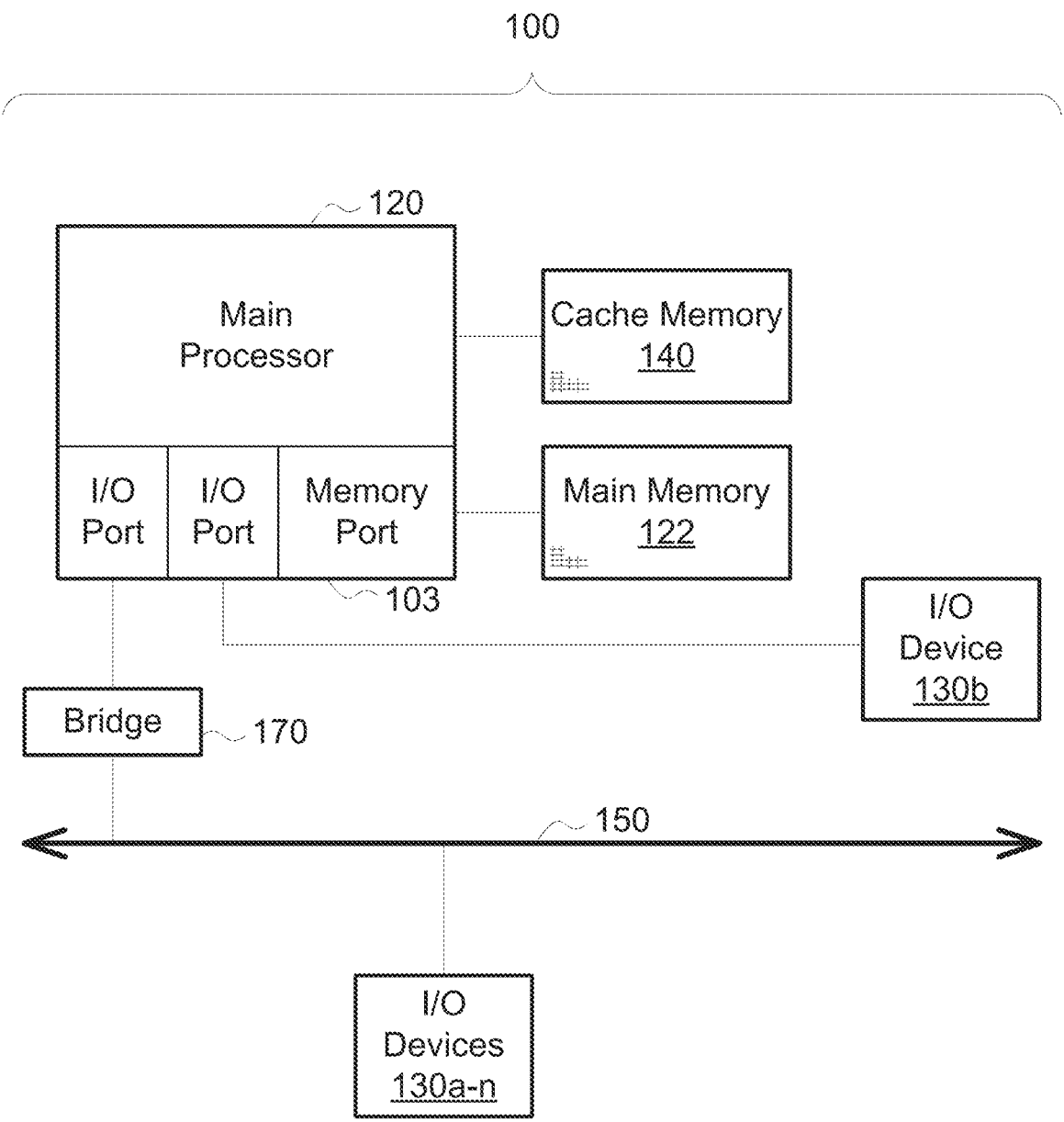

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Classifying Content to Prevent Data Breach or Exfiltration Described herein are systems and methods for classifying content to prevent data breach or exfiltration (e.g., opening, storing, downloading, uploading, movement). Various applications (e.g., web browsers, electronic mail applications, document processing applications, facsimile or printing applications, file/data transfer applications, and cloud storage applications), background system services (e.g., copy and paste operation, screenshot acquisition, and connection of removable computer storage), and/or other processes of a computing environment may attempt to access data. Such data may include document files, data strings, images, audio, or any other file format of data stored in the computing environment. A subset or constituent portion of the data may correspond to sensitive or confidential information, such as personal or security identifiers (e.g., account identifier, phone numbers, license plate numbers, birthdate, credit card numbers).

Such information may be identified as sensitive or confidential on a word-by-word or a phrase-by-phrase comparison with entries of a dictionary. The dictionary may include a large set of words or phrases marked as sensitive or confidential. Each entry may include a template of the word to account for slight variations (e.g., spacing, capitalization, plural form). Each word of a file may be compared against all the entries of the dictionary to determine whether the file contains sensitive or confidential information. Without any incorporation of context or other logic, however, such techniques may be inaccurate and may result in false positives for data breach/exfiltration/misuse. Thus many of the data breaches and exfiltration attempts by or using applications from the computing environment may be carried out undetected.

To increase the accuracy of identifying data as containing classified or sensitive information, an entity engine executing in the computing environment may classify content into various content types by applying a set of predefined entity definitions. Each entity definition may include a combination of a regular expression, a set of terms, and/or a set of dictionary entries, among others for a particular content type (e.g., account identifier, phone numbers, license plate numbers, birthdate, credit card numbers). The regular expression may include a set of Boolean operands. Each term may specify a string of characters for the content type. Each dictionary entry may specify words or phrases for the content type. Each operand can refer to a pattern, the terms, the dictionary entries, and/or to another entity definition. Each entity definition may also include a proximity window, a minimum threshold score, and/or maximum score. The proximity window may specify a number of characters in which at least two of the patterns, the terms, and/or the dictionary entries is to occur for the content type. The minimum threshold score may specify a lower limit for scoring/rating an occurrence of a match using the Boolean operand, or for scoring/rating a classification of the content into the content type. The maximum score may specify an upper limit for scoring/rating an occurrence of a match using the Boolean operand. The range of numerical values for the score may correspond to a degree of confidence that the content corresponds to the respective content type. In addition, the set of Boolean operands for each regular expression may be order-dependent or independent. The regular expression may specify the application of one operand, upon the occurrence of secondary data. The secondary data may correspond to one of the terms or one of the dictionary entries, and may function as a condition precedent to the application of the one of the operands in the regular expression.

Using the set of predefined entity definitions, the entity engine may classify the content into one of various content types. In one embodiment, the entity engine may access memory of the computing environment to obtain content accessible by applications and/or users for classification. For each entity definition of the corresponding content type, the entity engine may determine whether there is secondary data present in the content, e.g., as specified by the regular expression (e.g., in an operand) of the entity definition. When the content is determined to have the secondary data, the entity engine may then apply the operand(s) of the regular expression to the content to match with the elements of the expression. Each element may be within the predefined proximity window for there to be a match. With each match, the entity engine may assign a weight or score bounded by the minimum and/or maximum scores. If the content is determined to have a match with all the elements/operands of the regular expression, the entity engine may classify the content into the corresponding content type with the determined score for the content type.

In comparison to the word-by-word dictionary approach, for instance, the use of the set of the predefined entity definitions in this manner may result in higher accuracy in identifying sensitive or confidential information contained in content. Moreover, the application of the operands upon determination of the presence of corresponding secondary data within the content may lead to lower false positives. Once the content has been classified to have a content type identified as containing sensitive or confidential information, the entity engine may for example identify activities corresponding to the data type, that are considered to be unauthorized or relate to data misuse/breach/exfiltration, and can prevent such unauthorized access or exfiltration of the content by any user or application running in the computing environment.

Figure 2A:
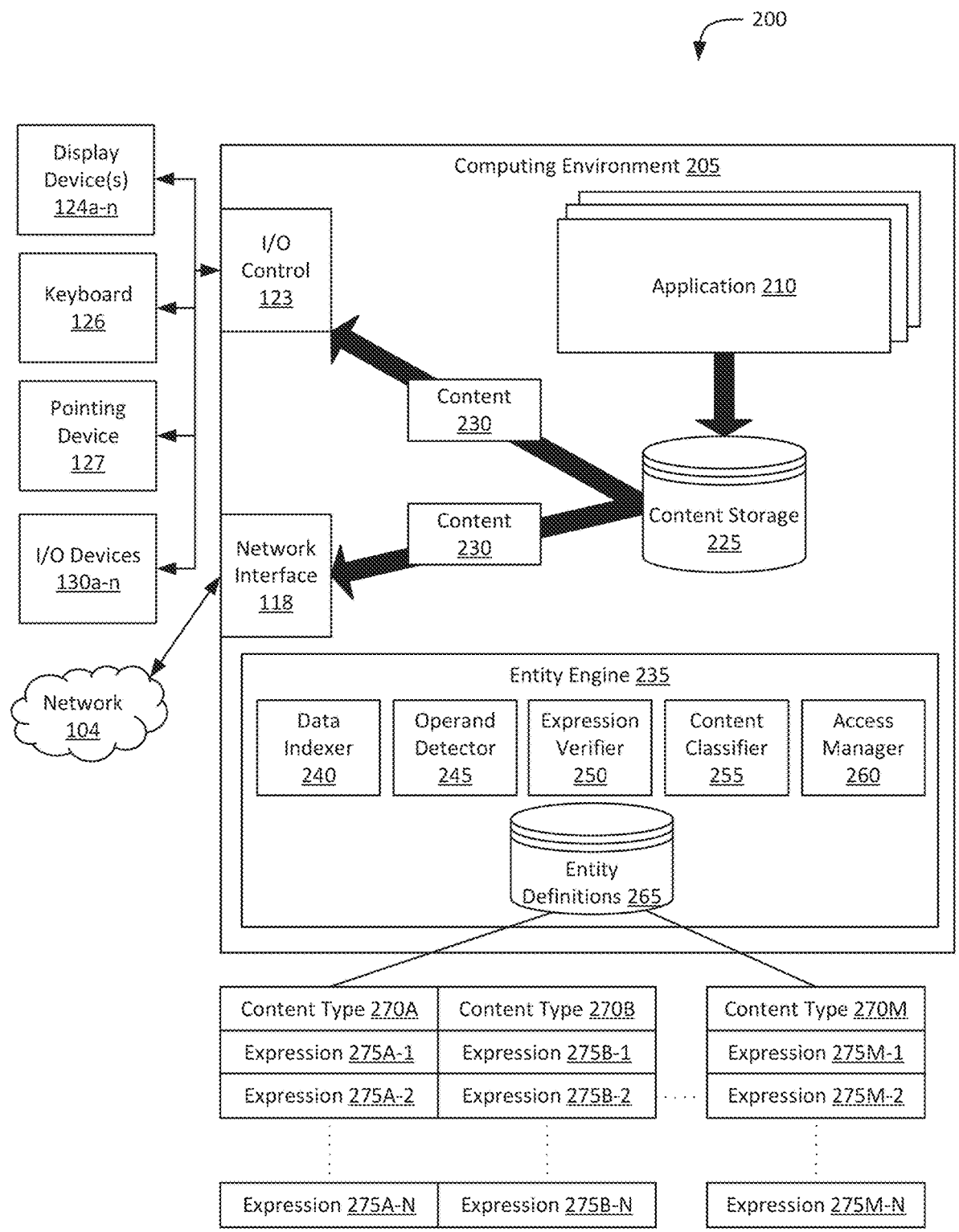
FIG. 2A is a block diagram depicting an example embodiment of a system for classifying content to prevent data breach or exfiltration.

Referring now to FIG. 2A, an embodiment of a system 200 for classifying content to prevent data breach or exfiltration or misuse is depicted. In brief overview, the system 200 may include a computing environment 205. The computing environment 205 may correspond to the computing device 100 as described in FIGS. 1C and/or 1D, and may include an application 210, a content storage 225, and/or an entity engine 235 which can interact with the network interface 118 and/or I/O control 123. The application 210 may comprise any type or form of software, script or program, such as a background system service or program. The content storage 225 may include or store content 230. The entity engine 235 may include a data indexer 240, an operand detector 245, an expression verifier 250, a content classifier 255, an access manager 260 and/or a dataset of entity definitions 265. The database of the entity definitions 265 may be stored on memory of the computing environment 205.

Each of the above-mentioned elements or entities (e.g., application 210, content storage 225, content 230, and entity engine 235 and its components) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In an attempt to access and/or transfer data from the computing environment 205, a user and/or an application 210 may perform an unauthorized or potentially risky access of the content storage 225. The application 210 may be any type of executable running on the computing environment 205, such as a cloud-synchronization application, an electronic mail application, a word processor application, a document-rendering application, a data transfer application, a data copying application, a facsimile application, or a printing application, among others. The attempt to perform the unauthorized access by the application 210 may be triggered by any selection of the graphical user interface elements, an invocation of an API function call, or otherwise another action/routine directly or indirectly initiated by the application 210, by multiple applications or by a user.

The attempt at an unpermitted or risky transfer of content 230 (e.g., stored on the content storage 225) from/within/to the computing environment 205 by the user or application 210. For instance, there may be an attempt to move or place sensitive data into a location which is not secured. And by way of example, a transfer of content from the computing environment 205 may occur in at least two ways. The application 210 may attempt to transfer the content 230 to the network interface 118 to transmit the content 230 via the network 104 to another computing device. The application 210 may attempt to transfer the content 230 to the I/O control 123 to output the content 230 on one of the I/O devices 130a-n, the display devices 124a-n, or another computer readable storage medium connected to the computing environment 205. An I/O device may include for instance a printer or fax machine, a flash drive or other peripheral/storage device that can receive files, an I/O interface to send files to a network or another device, or a user-input device (e.g., keyboard with print key) that can be used to perform or facilitate data movement. In some embodiments, the computing environment 205 may be used to transfer data from/via the network 104 to one or more I/O devices (e.g., an illegal or restricted destination or storage location). The I/O device can refer to software and/or hardware, for instance software that does the data exfiltration or movement (e.g., the web browser, the application), and/or the destination of the exfiltrated data.

To identify content 230 accessible by the user or application 210 as containing sensitive or confidential information, the data indexer 240 may receive content 230 for classification, e.g., for preventing data breach or exfiltration. In some embodiments, the data indexer 240 may access the content storage 225 to identify the content 230. Each content 230 may include one or more characters in the form of a string, some of which may correspond to sensitive or confidential information. The content storage 225 may correspond to one or more directories maintaining, storing or otherwise including the content 230. Each content 230 may correspond to the information on one or more files (e.g., document files, spreadsheet files, electronic emails, database files, image files, audio files, video files) stored within or otherwise accessible from the computing environment 205. Each content 230 may be stored on the storage 128, main memory 122, cache memory 140, I/O devices 130a-n, or any other computer readable storage medium connected to or within the computing environment 205. In some embodiments, the content 230 may span over multiple files stored on the computing environment 205. The one or more files including the content 230 of the content storage 225 may have one or more attributes. Each file may be associated with a residing location. The residing location may be a file pathname that may indicate a drive letter, volume, server name, root directory, sub-directory, file name, and/or extension among others. Each file may be associated with an owner indicated using a user identifier (e.g., username, screenname, account identifier, electronic mail address) for example. Each file may be associated with a source or author. Each file may be associated with a file type. Each file may be associated with a file system permission specifying ability to read, write, and execute for different applications 210 and users of the computing environment 205.

Once the content 230 (or data) accessible by the application 210 is identified, the entity definitions 265 stored in the database may be used to classify the content 230. The entity definitions 265 may be stored and maintained at the database using a data structure, such as an array, a matrix, a table, a linked list, a heap, a hash map, a binary tree, and a skip list, among others. Each entity definition may correspond to one of multiple content types or data types 270A-M (hereinafter generally referred to as content type 270). The entity definition for the content type 270 may include one or more Boolean expressions 275A-1 to 275M-N (hereinafter generally referred to as Boolean expression 275). Each Boolean expression 275 (sometimes referred to as "regular expression") of the content type 270 may specify one or more Boolean operators for a plurality of operands. The one or more Boolean operators may include disjunction ("OR"), conjunction ("AND"), negation ("NOT"), exclusive disjunction ("XOR"), alternative denial ("NOR"), joint denial ("NAND"), material implication ("If . . . then"), converse implication ("Not . . . without"), and/or bi-conditional ("If and only if"), among others.

Each operand of the Boolean expression 275 of the entity definition may include a matching element used to matching against the content 230 undergoing classification to one of the content types 270. Each operand for the matching element may correspond to one of a pattern, a term, a dictionary of words or phrases, or a reference to another entity definition to match against the content 230. The pattern may include a template for a set of characters. For example, the pattern may specify "xx-xxx-xxxx", where "x" corresponds to a numerical value and "-" is a hyphen. The term may include a specific string of characters (e.g., "California" or "resident"). The dictionary may include a string of characters corresponding to a word or a phrase. In some embodiments, the dictionary may include a list of entries. Each entry of the dictionary may include a string of characters corresponding to the word or the phrase. In some embodiments, the list of entries may be specified to be case insensitive or case sensitive. For example, the entry "London" may be used to match with "London", "LONDON", and "LoNdOn," among others, in the dictionary. In some embodiments, the list of entries may include variations in the word or the phrase to account for differences in spacing and punctuation. For example, the entry "P.O.Box" in the dictionary may be used to also match with "P.O. Box" and "P. O. Box", among others. In some embodiments, the operand may reference another entity definition to match against. The operand may be determined to match, upon determination that the other entity definition is matched. In some embodiments, the other entity definition in the database 265 may be referenced using an entity identifier.

At least one of the operands of the Boolean expression 275 may correspond to or specify the secondary data that should be present in the content 230. The presence of the secondary data in the content 230 may function as a condition precedent for application of the respective operator and/or matching element of the Boolean expression 275. In some embodiments, one or more of the operands may each specify secondary data that is to be present in the content 230. The Boolean expression 275 may specify a conjunction ("AND") between an operand that specifies the secondary data, and another operand. In some embodiments, the same operand may specify the matching element to match against the content 230 as well as the secondary data that should be present in the content 230. In some embodiments, some operands may specify the matching element to match against the content 230, without specifying any secondary data that should be present in the content 230. In some embodiments, a set of secondary data may be specified over/for a set of multiple operands of the Boolean expression 275. For each operand in the set, the same set of the secondary data that should be present in the content 230 may be specified.

The secondary data that should be present in the content 230 may include one or more terms and/or one or more entity identifiers. Each term may include a specific set of characters. Each entity identifier may reference another entity definition in the database 265. The secondary data may be determined to be present in the content 230 upon determination that the other entity definition is matched. In some embodiments, the one or more terms and/or the one or more entity identifiers may be relevant or correlate to a context of the corresponding matching element. The context may be homonymic, synonymic, or antonymic, among others. The homonymic context may refer to sets of characters with similar lexical representation but differing semantic information. For example, a set of terms for a homonymic context may include "May Fournier" and "May Fourth." The synonymic context may refer to sets of characters with similar semantic information. For example, a set of terms for a single synonymic context may include "carbon dioxide", "hydrochloric acid", "pectin", "sodium chloride", and "zinc," as these terms are chemicals. The antonymic context may refer to sets of characters with differing or opposing semantic information. For example, a set of terms for an antonymic context may include "dark" and "light." In some embodiments, the one or more terms correlating to the context may be defined by a semantic network. The semantic network may include a set of nodes and vertices. Each node may represent a word or phrase. Each vertex may connect two nodes, and may indicate a semantic relationship (e.g., homonymic, synonymic, or antonymic) between the words or phrases associated with the two nodes of the semantic network.

The Boolean expression 275 may also specify for the validation of a string of characters. The validation applied on each subgroup of the string of characters may be in addition to the application of the operators and/or the operands (e.g., application of a matching element of an operand, such as a regular expression) specified by the Boolean expression 275. The validation may use a checksum algorithm and/or an error-detection code algorithm. In some embodiments, the Boolean expression 275 may specify for the application of the Luhn algorithm (e.g., modulus 10) to validate the string of characters. The validation may leverage a predefined pattern of characters in the subgroup of characters for the particular content type 270. For example, each character in certain strings of characters (e.g., social security numbers, bank card number, security codes, and dates) may follow a predefined pattern that may be leveraged by the validation algorithm. The Boolean expression 275 may specify the application of a quantifier to one or more subgroups of characters. In some embodiments, Boolean expression 275 may also specify the application of the quantifier to be restricted to a particular subgroup of characters. For example, the Boolean expression 275 may specify the validation in the form of "\b(social|ssn)\s+([0-9]{3}(\-?) [0-9]{2}\3[0-9]{4})\b" to verify social security numbers. In this example, this regular expression may be used to validate "ssn 564-76-8334" or "social 872486838" as the content type 270 corresponding to social security numbers.

In some embodiments, one or more operands of the Boolean expression 275 may specify a weight for determining a matching score for the operand. The weight may indicate a constituent score for the total matching score, upon determination that the content 230 matches the matching element for the operand. In some embodiments, the weight may be a multiplicative factor. In some embodiments, the weight may be a numerical value and may range from 0 to 1, −1 to 1, 0 to 10, −10 to 10, and −100 to 100, or any other range of values. In some embodiments, the sum of the weights for all the operands of the Boolean expression 275 may equal 100. In some embodiments, the weight for at least one of the operands of the Boolean expression 275 may equal zero. The operand corresponding to a weight of zero may not contribute to the overall score of the content type 270 but may be used to evaluate whether the content 230 matches the Boolean expression 275 for the content type 270. In some embodiments, each operand may specify a maximum score for a matching score for the matching element of the operand. The maximum score may specify an upper bound to the matching score for matching the matching element of the operand.

The Boolean expression 275 may further specify a proximity window for two or more of the operands for the Boolean expression 275 for the corresponding content type 270. In some embodiments, the proximity window may be for all the operands of the Boolean expression 275. The proximity window may specify a number of characters or terms within which at least two of the operands are to occur for the classification of the content 230 as the content type 270. In some embodiments, the Boolean expression 275 may specify a plurality of proximity windows. Each proximity window may specify a number of characters or terms within which at least two of the operands are to occur for the classification of the content 230 as the content type 270. The Boolean expression 275 may specify a sequential order of operands to classify the content 230 as the content type 270. The sequential order may indicate a sequence in which the operands of the Boolean expression 275 are to occur to classify the content 230 as the content type 270. In some embodiments, the Boolean expression 275 may specify the sequential order for each proximity window for two or more operands of the Boolean expression 275 for the corresponding content type 270.

The Boolean expression 275 may specify a minimum number of match occurrences for each operand for classification of the content 230 as the corresponding content type 270. The minimum number of match occurrences may indicate a minimum number of the operands that the content 230 is to match for the content 230 to be classified as the content type 270 corresponding to the Boolean expression 275. The Boolean expression 275 may specify a minimum threshold score for all the matching elements with the content 230 for classification of the content 230 as the corresponding content type 270. The minimum threshold score may indicate a minimum sum of scores or weights from the matches with all the operands matching with the content 230 for classification of the content 230 as the corresponding content type 270.

Each entity definition may be predefined in the database 265, and may be used to identify whether the content 230 corresponds to a content type that is known or expected to contain sensitive or confidential information. In some embodiments, the entity definitions may be specified using Extensible Markup Language (XML). The entity definition may, for example, be in the form:

```
<entity>
    <item>
        <ouid>entity.ssn.us</ouid>
        <name>Social Security Numbers (US)</name>
        <proximity>200</proximity>
        <min_score>20</min_score>
        <rule>
            <operator>and</operator>
            <rule>
                <operator>or</operator>
                <operand>
                    <ref>pattern.ssn.us.rnd</ref>
                    <weight>15</weight>
                    <max_score>100</max_score>
                </operand>
                <operand>
                    <ref>pattern.ssn.us.rnd_fmt</ref>
                    <weight>12</weight>
                    <max_score>100</max_score>
                </operand>
                <operand>
                    <ref>pattern.ssn.us.rnd_unf</ref>
                    <weight>10</weight>
                    <max_score>100</max_score>
                </operand>
            </rule>
            <rule>
                <operator>or</operator>
                <operand>
                    <ref>terms.ssn.en</ref>
                    <weight>5</weight>
                    <max_score>5</max_score>
                </operand>
                <operand>
                    <ref>dictionary.proper_names.us</ref>
                    <weight>5</weight>
                    <max_score>5</max_score>
                </operand>
                <operand>
                    <ref>pattern.addr.us.state_zip</ref>
                    <weight>5</weight>
                    <max_score>5</max_score>
                </operand>
            </rule>
        </rule>
    </item>
</entity>
```

Using the entity definitions stored in the database 265, the operand detector 245 may determine whether that secondary data is present in the content 230. The secondary content may be defined by one or more of the operands of the Boolean expression 275 for each entity definition. In some embodiments, the operand detector 245 may parse the content 230 to identify a string of characters. Each term may correspond to one or more characters in the content 230. The operand detector 245 may traverse through the string of characters identified from the content 230. Concurrently or separately, the operand detector 245 may also traverse through the Boolean expressions 275 of each content type 270. For each Boolean expression 275, the operand detector 245 may identify the secondary data defined by at least one of the operands of the Boolean expression 275. The secondary data may be defined by one of the operands in the Boolean expression 275, for example, in the following form:

```
<operand type="secondary">
    <ref>pattern.addr.us.state_zip</ref>
    <weight>5</weight>
    <max_score>5</max_score>
</operand>
```

While traversing the string of characters, the operand detector 245 may compare with the operand defining the secondary data for the content type 270. As discussed previously, the operand may include a matching element for the subset of strings of characters forming the content 230 to match. Furthermore, some operands of the Boolean expression 275 may specify the presence of the secondary content in the content 230, in addition to the matching element. In some embodiments, the operand detector 245 may apply the operand defining the secondary data for the content type 270 to the subset of strings of characters forming the content 230. If none of the subset of strings of characters forming the content 230 is determined to match the operand defining the secondary data, the operand detector 245 may determine that the secondary data is not present in the content 230. On the other hand, if at least one subsets of strings of characters forming the content 230 is determined to match the operand defining the secondary data of the content type 270, the operand detector 245 may determine that the secondary data is present in the content 230.

Once the secondary data is determined to be present in the content 230 for the content type 270, the expression verifier 250 may determine whether there is match between the matching elements of the operands of the Boolean expression 275 against the content 230. The expression verifier 250 may identify the one or more Boolean expressions 275, each with the operand defining the secondary data present in the content 230. For each Boolean expression 275, the expression verifier 250 may then apply the operands of the Boolean expression 275 to the content 230. In some embodiments, the expression verifier 250 may traverse through the string of characters forming the content 230. The expression verifier 250 may also traverse through the remaining operands of each Boolean expression 275 with at least one operand defining at least one corresponding secondary data that should be present in the content 230. For each string of characters, the expression verifier 250 may determine whether there is a match between the string of characters and the matching element of the operand.

The expression verifier 250 may also validate each subgroup of each string of characters. The subgroup may correspond to a subset of characters included in the string of characters, (e.g., words or characters separated by spacing or delimiter). The validation applied on each subgroup of the string of characters by the expression verifier 250 may be in addition to the application of the operators and/or the operands specified by the Boolean expression 275. For each subgroup of each string of characters, the expression verifier 250 may validate the subgroup using a checksum algorithm and/or an error-detection code algorithm. In some embodiments, the expression verifier 250 may apply a Luhn algorithm (e.g., modulus 10) to validate the subgroup of each string of characters. The validation applied by the expression verifier 250 may leverage a predefined pattern of characters in the subgroup of characters for a particular content type 270. For example, each character in certain strings of characters (e.g., social security numbers, bank card number, security codes, and dates) may follow a predefined pattern that may be leveraged by the validation algorithm applied by the expression verifier 250. In some embodiments, the validation to be applied by the expression verifier 250 may be predefined by the Boolean expression 275. The Boolean expression 275 may specify the application of a quantifier to one or more subgroups of characters. In some embodiments, Boolean expression 275 may also specify the application to qualifier to be restricted to a particular subgroup of characters. For example, the Boolean expression 275 may specify the validation in the form of "\b(social|ssn)\s+([0-9]{3}(\-?)[0-9]{2}\3[0-9]{4})\b" to verify a social security number. In this example, this regular expression may be used to validate "ssn 564-76-8334" or "social 872486838" as social security numbers.

For each match between the string of characters and the matching element of the operand, the expression verifier 250 may update a matching score for the content type 270. In some embodiments, the expression verifier 250 may identify a weight for the match with the matching element of the operand. As discussed above, the Boolean expression 275 may specify a weight for determining a match between the content 230 and the respective operand. In response to each match, the expression verifier 250 may add the weight to the matching score for the content type 270. In some embodiments, the expression verifier 250 may apply the weight as a multiplicative factor to the constituent score for the match between the matching element and the string of characters forming the content 230. Based on the weights for each match between the matching element and the string of characters, the expression verifier 250 may determine or otherwise calculate a matching score for the content type 270. In some embodiments, the expression verifier 250 may maintain a counter to keep track of a number of matches between the content 230 and the operands of the Boolean expression 275. For each match determined between the matching element and the string of characters, the expression verifier 250 may increment the counter for the number of matches.

In some embodiments, between two matches of the string of characters with the two respective matching elements, the expression verifier 250 may update the matching score in accordance with the Boolean operator specified by the Boolean expression 275. The expression verifier 250 may identify the Boolean operator to be applied to the two operands. The expression verifier 250 may apply the Boolean operator to the two operands. If the Boolean operator is a disjunction ("OR"), the expression verifier 250 may add the resultant scores corresponding to the operands when either operand is determined to match. If the Boolean operator is a conjunction ("AND"), the expression verifier 250 may add the two resultant matching scores when both operands are determined to match. If the Boolean operator is a negation ("NOT") to one of the operands, the expression verifier 250 may nullify or negate the resultant score for the matching element corresponding to the operand. Summations of the matching scores for the other Boolean operators may be performed by composing the resultant scores using disjunctions, conjunctions, and/or negations. For example, if the Boolean operator is a material implication ("If ... then"), the expression verifier 250 may nullify or negate the first matching score corresponding to the first operand and add to the second matching score corresponding to the second operand. The expression verifier 250 may apply all the Boolean operators specified by the Boolean expression 275 to calculate the aggregate matching score for the content type 270.

Based on the application of all the operands and operators of the Boolean expression 275 on the content 230, the content classifier 255 may classify the content 230 into the content type 270 corresponding to the Boolean expression 275. If the strings of characters of the content 230 is determined not to match with all of the matching elements of the remaining operands as specified by the operators of the Boolean expression 275, the content classifier 255 may determine not to classify the content 230 as the content type 270. Conversely, if the strings of character of the content 230 is determined to match with all the remaining elements of the operands as specified by the operators of the Boolean expression 275, the content classifier 255 may classify the content 230 into the content type 270. In some embodiments, the content classifier 255 may classify the content 230 into the content type 270 based on the matches between the matching element of each operand to the strings of characters forming the content 230. In some embodiments, the content classifier 255 may use the matches with the operands and the predefined proximity window specified by the Boolean expression 275 to classify the content 230 into the corresponding content type 270. In some embodiments, the content classifier 255 may compare the matching score to a minimum threshold score of the Boolean expression 275 to classify the content 230 into the corresponding content type 270.

With multiple matches between the string of characters and the matching element, the content classifier 255 may determine whether two matching elements occur within the predefined proximity window specified by the Boolean expression 275. As discussed above, the proximity window may specify a number of characters or terms within which at least two of the operands are to occur for the classification of the content 230 as the content type 270. In some embodiments, the content classifier 255 may identify a first index number for a first match and a second index number of a second match. The first index number may indicate a position of the string of characters determined to match the matching element for the first match within the content 230. The second index number may indicate a position of the string of characters determined to match the matching element for the second match within the content 230. The content classifier 255 may calculate an index difference between the first index number and the second index number. The expression verifier 250 may compare the index difference to the proximity window. If the index difference is determined to be greater than the proximity window, the content classifier 255 may determine that the two corresponding matches are outside the proximity window. If at least one of the two matches is determined to be outside the proximity window, the content classifier 255 may determine that the content 230 is not to be classified as the content type 270.

On the other hand, if the index difference is determined to be less than or equal to the proximity window, the content classifier 255 may determine that the two corresponding matches are within the proximity window. The content classifier 255 may continue to determine whether the other index differences are within the proximity window. Additionally, the content classifier 255 may determine whether the operands occurs in the sequential order within the proximity window as specified by the illustrative Boolean expression 275:

```
<entity>
    <item>
        <ouid>entity.ssn.us</ouid>
        <name>Social Security Numbers (US)</name>
        <proximity>200</proximity>
```

-continued

```
<proximity_orders>
<proximity_order>
    <operand>O1</operand>
    <operand>O3</operand>
</proximity_order>
<proximity_order>
    <operand>O2</operand>
    <operand>O3</operand>
</proximity_order>
</proximity_orders>
    <min_score>20</min_score>
    <rule>
    ...
    </rule>
</item>
</entity>
```

If all the index differences for the matches of operands are determined to be less than or equal to the proximity window in the order specified by the sequential order, the content classifier 255 may determine that the content 230 is to be classified as the content type 270.

Having applied all the operands and operators of the Boolean expression 275, the content classifier 255 may compare the matching score to the minimum threshold score specified by the Boolean expression 275 for the content type 270. As discussed above, the minimum threshold score may specify a minimum sum of scores and/or weights from the matches with all the operands matching with the content 230 for classification of the content 230 as the corresponding content type 270. If the total matching score is determined to be less than or equal to the minimum threshold score, the content classifier 255 may determine that the content 230 is not to be classified as the content type 270. On the other hand, if the total matching score is determined to greater than the minimum threshold score, the content classifier 255 may determine that the content 230 is to be or can be classified as the content type 270.

In some embodiments, the content classifier 255 may compare the number of matches to the minimum number of occurrences across the operands for the classification of the content 230 as the content type 270. As discussed previously, the minimum number of match occurrences may indicate a minimum number of the operands that the content 230 is to match for the content 230 to be classified as the content type 270 corresponding to the Boolean expression 275. The operand for the minimum number of matches may specified, for example, in the following illustrative manner using XML:

```
<operand type="secondary">
    <ref>pattern.addr.us.state_zip</ref>
    <weight>5</weight>
    <max_score>5</max_score>
    <min_occurs>4</min_occurs>
</operand>
```

The content classifier 255 may identify the number of matches from the counter for keeping track. If the total number of occurrences is determined to be less than or equal to the minimum number of occurrences, the content classifier 255 may determine that the content 230 is not to be classified as the content type 270. On the other hand, if the total number of occurrence is determined to greater than the minimum number of occurrence, the content classifier 255 may determine that the content 230 is to be or can be classified as the content type 270.

Upon classifying the content 230 as one of the content types using the entity definitions, the access manager 260 may manage the content 230 for data loss prevention to prevent data breach or exfiltration by the application 210 in the computing environment 205. In some embodiments, the access manager 260 may assign a severity level to each content type 270 of the entity definitions stored in the database 265. The severity level may be predefined based on the content type 270, and may be a numerical value. The severity level may also indicate a degree of sensitivity or confidentiality of the type of the information corresponding to the content type 270. In some embodiments, the access manager 260 may perform a set of actions on the content 230 for data loss prevention in accordance to the severity level of the content type 270 to which the content 230 is classified into. The set of actions may include warning the user of potential data breach (e.g., by displaying a prompt), blocking access of the content 230 by the application 210, restricting exfiltration of the content 230 via the I/O control 123 and/or the network interface 118, among other measures.

Figure 2B:
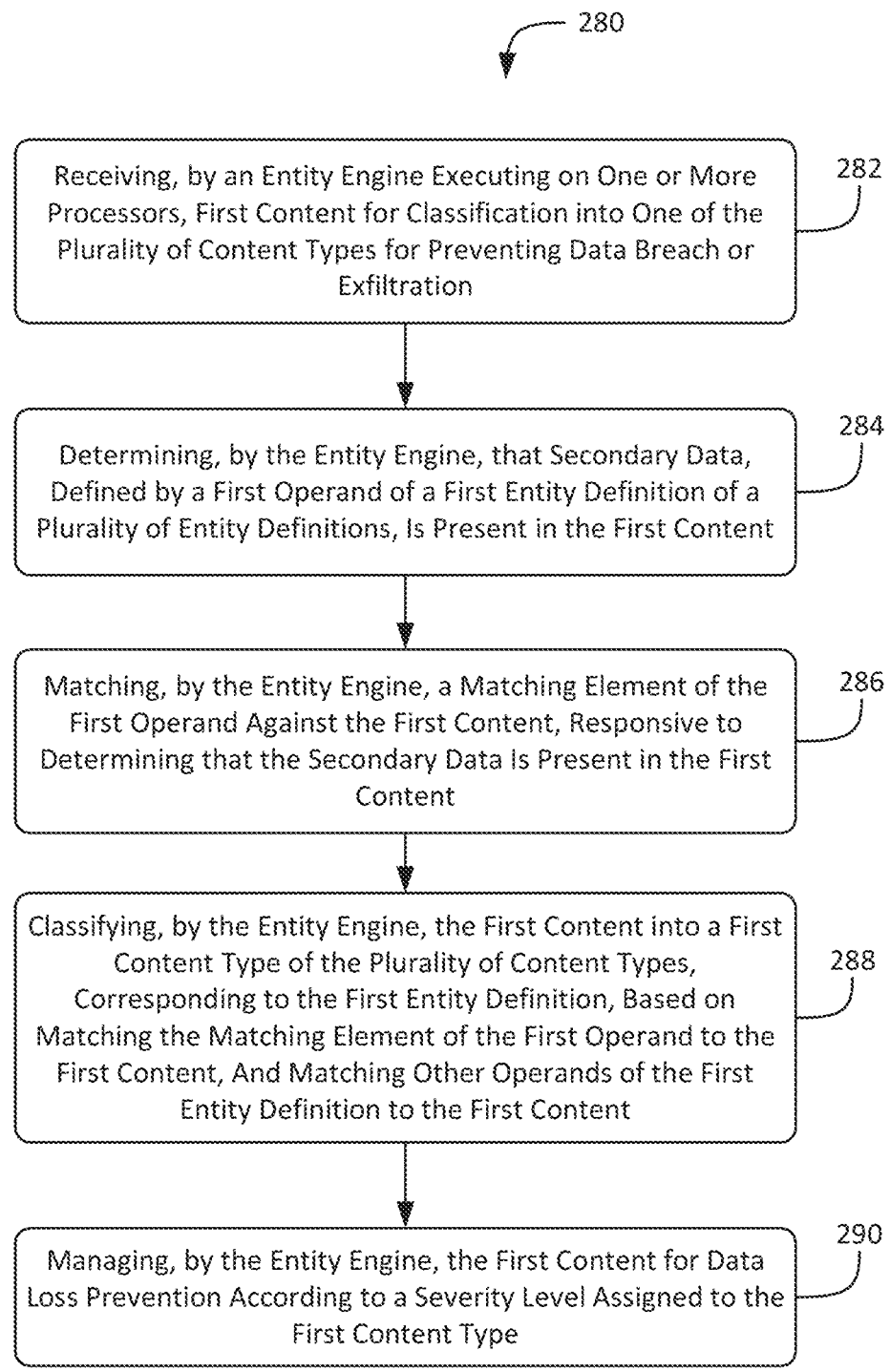
FIG. 2B is a flow diagram depicting an example embodiment of a method of classifying content to prevent data breach or exfiltration.

Referring now to FIG. 2B, an embodiment of a method 280 for classifying content to prevent data breach or exfiltration is depicted. The method 280 may be performed or be executed by any one or more components of system 100 as described in conjunction with FIGS. 1A-1D or system 200 as described in conjunction with FIG. 2A such as the data indexer 240, the operand detector 245, the expression verifier 250, and/or the content classifier 255 of the entity engine 235. In brief overview, the method 280 may include receiving, by an entity engine executable on one or more processors, first content for classification into one of the plurality of content types for preventing data breach or exfiltration (282). The method 280 may include determining, by the entity engine, that secondary data, defined by a first operand of a first entity definition of a plurality of entity definitions, is present in the first content (284). The method 280 may include matching, by the entity engine, a matching element of the first operand against the first content, responsive to determining that the secondary data is present in the first content (286). The method 280 may include classifying, by the entity engine, the first content into a first content type of the plurality of content types, corresponding to the first entity definition, based on matching the matching element of the first operand to the first content, and matching other operands of the first entity definition to the first content (288). The method 280 may include managing, by the entity engine, the first content for data loss prevention according to a severity level assigned to the first content type (290).

Referring to (282), and in further detail, the method 280 may include receiving, by an entity engine executable on one or more processors, first content for classification into one of the plurality of content types for preventing data breach or exfiltration. The entity engine may access the content storage to identify the content. The first content may include one or more characters in the form of a string, some of which may correspond to sensitive or confidential information. The first content may correspond to the information on one or more files (e.g., document files, spreadsheet files, electronic emails, database files, image files, audio files, video files) stored within or otherwise accessible from the computing environment.

Referring to (284), and in further detail, the method 280 may include determining, by the entity engine, that secondary data, defined by a first operand of a first entity definition of a plurality of entity definitions, is present in the first content. Each entity definition of the plurality of entity definitions may correspond to one of a plurality of content types, and may include a Boolean expression of a plurality of operands. At least one operand of the plurality of operands (e.g., the first operand) may include a matching element to be used for matching against content undergoing classification into one of a plurality of content types, upon one or more secondary data defined by the at least one operand being present in the first content. The first operand itself corresponding to the specification that the secondary data is to be present in the content, may be the secondary data. The Boolean expression may specify a conjunction ("AND") between the first operand that may be the secondary data and another operand. In some embodiments, the same operand may specify the matching element to match against the content and the secondary data that should be present in the content. In some embodiments, some operands may specify the matching element to match against the content, without specifying that the secondary data that should be present in the content. The entity engine may compare the subsets of strings of characters forming the first content with the secondary data specified (e.g., by the first operand) for the first content type. The entity engine may match the information defining or specifying the secondary data to the subset of string of characters forming the first content. If none of the strings of characters of the first content is determined to match the secondary data, the entity engine may determine that the secondary data is not present in the first content. On the other hand, if at least one subset of strings of characters forming the first content is determined to match the secondary data of the first content type, the entity engine may determine that the secondary data is present in the first content.

Referring to (286), and in further detail, the method 280 may include matching, by the entity engine, a matching element of the first operand against the first content, responsive to determining that the secondary data is present in the first content. The entity engine may identify the one or more Boolean expressions, each having an operand defining secondary data that should be present in the first content. For each Boolean expression, the entity engine may then apply the operands of the Boolean expression to the first content. The entity engine may traverse through the string of characters forming the first content. The entity engine may also traverse through the remaining operands of each Boolean expression (for instance with one operand defining the secondary data that should be present in the first content). For each string of characters, the entity engine may determine whether there is a match between the string of characters and the matching element of the operand. Each time there is match, the entity engine may determine a matching score for the content type based on the weight specified for the operand corresponding to the match of the first content. In some embodiments, the entity engine may validate each subgroup of each string of characters forming the content. For each subgroup of each string of characters, the entity engine may validate the subgroup using a checksum algorithm and/or an error-detection code algorithm (e.g., Luhn algorithm) to validate the subgroup of each string of characters for the specified content type. The validation to be applied by the entity engine may be predefined by the Boolean expression.

Referring to (288), and in further detail, the method 280 may include classifying, by the entity engine, the first content into a first content type of the plurality of content types, corresponding to the first entity definition, based on matching the matching element of the first operand to the first content, and matching other operands of the first entity definition to the first content. If the strings of characters of the first content are determined not to match with all of the matching elements of the remaining operands as specified by the operators of the Boolean expression, the entity engine may determine not to classify the first content as the first content type. Conversely, if the strings of character of the first content are determined to match with all the remaining elements of the operands as specified by the operators of the Boolean expression, the entity engine may classify the first content into the first content type.

In some embodiments, the entity engine may classify the first content as belonging to the first content type based on the number of matches exceeding a minimum number of matches. In some embodiments, the entity engine may classify the first content into the first content type by comparing a matching score to the minimum threshold score specified by the Boolean expression for the content type. Between multiple matches, the entity engine may determine whether the first matching element of the first operand and a second matching element of the second operand are within a predefined proximity window. If the two matching elements are greater than the predefined proximity window, the entity engine may determine not to classify the first content into the first content type, or to provide a low matching score. If the two matching elements are less than or equal to the predefined proximity window, the entity engine may classify the first content into the first content type.

Referring to (290), and in further detail, the method 280 may include managing, by the entity engine, the first content for data loss prevention according to a severity level assigned to the first content type. The entity engine may manage the first content for data loss prevention to prevent data breach or exfiltration by the application in the computing environment. In some embodiments, the entity engine may assign a severity level to each content type of the entity definitions. The severity level may be predefined based on the content type. The severity level may also indicate a degree of sensitivity or confidentiality of the type of the information corresponding to the content type. The entity engine may perform a set of actions on the content for data loss prevention in accordance to the severity level of the content type to which the content is classified into. The set of actions may include warning the user of potential data breach (e.g., by displaying a prompt), blocking access of the content by the application, restricting exfiltration of the first content via the I/O control and/or the network interface, among other measures.

C. Systems and Methods for Defining and Securely Sharing Objects for Use in Preventing Data Breach or Exfiltration In classifying content to prevent data breach, misuse or exfiltration, various predefined definitions or objects can be used to identify sensitive or confidential information. Such definitions or objects may be included in software packages or software development kits that can be applied to a particular computing or networked environment. Various versions or variants of such definitions or objects may be developed and defined, and can interoperate or combine with other software objects or components for internal validation, and then extracted or customized into software packages/kits that are delivered for external deployment for instance. Copies of the predefined definitions or objects can be maintained or stored internally, so that certain scenarios or purported issues with a certain software package that are encountered externally, can be reproduced and evaluated internally. Certain aspects of the present solution allow for validation of definitions or objects in a deployed software package, so as to detect possible tampering or inadvertent change that would cause a mismatch between objects/ definitions that are maintained internally and those that are deployed externally.

Some definitions/objects for identifying confidential or sensitive information contained in content may be accessible by end users of clients via a development platform or software package (e.g., software development kit (SDK)). With the use of the development platform or the software package, other components such as internal definitions and implementations details can be hidden from the end users. The development platform may also prevent tampering of entity definitions and may allow for version control, upgrades, and/or passing of metadata related to the entity definitions to the end user. In the development platform, entity definitions for identifying confidential or sensitive information may be specified using objects (e.g., variables, data structures, functions, class definitions). A subset of such objects may be provided by default from a platform server associated with the development platform. The predefined objects may be provided as part of a library of entity definitions, and may be maintained and updated from the platform server. Another subset of these objects may be created and specified by the end user, and may be shared with other end users of the development platform.

To prevent the end user defined objects (or end user) from altering predefined objects for use in identifying confidential or sensitive information in content, a validation engine may apply a schema validation on the predefined objects on the server-side and/or the client-side. There may be a separate predefined internal schema on the server-side and a predefined schema on the client-side for predefined objects. Each schema may specify one or more parameters for the predefined entity definitions. Based on the predefined internal schema on the server-side, the validation engine may generate a set of objects associated with the predefined entity definitions. In generating each object in the set, the validation engine may create an identifier and a signature for the object. The identifier may be used to associate with the end user defined object. The signature may define inputs, outputs, and other definition parameters of the object. The set of objects generated using the predefined internal schema may be encrypted, stored, and maintained on a database at the server.

From the predefined internal set of objects, the validation engine may generate a predefined external set of objects for deployment on a particular computing environment, networked environment or platform (sometime generally referred to as a "client system"). The predefined external set may include a subset of the predefined objects and may contain less information regarding the entity definitions than the predefined internal set. The information included with the predefined external set may include the name, description, identifier, signature, and/or other metadata for the object. Internal implementation details, such as internal services, encryption type, and some of the metadata, may be stripped from the information for the predefined external set of objects. The predefined external set provided to the client may constitute a subset of the predefined internal set of objects maintained at the server.

At the client system, the end user may define new objects or modify predefined objects for additional entity definitions to identify sensitive or confidential information in content within the computing environment. New objects defined by the new user may be added to the predefined external set of objects. To verify that none of the predefined set of objects has been tampered, an evaluation engine may compare the identifiers and signatures of the predefined external set of objects at the client with the corresponding identifiers and signatures of the predefined internal set of objects at the server. If any of the corresponding identifiers and signatures differ, the evaluation engine may determine that the predefined external set of objects has been tampered by the end user. Conversely, if all the corresponding identifiers and the signatures match, the evaluation engine may determine that the predefined external set of objects has not been tampered. The evaluation engine may then proceed to analyze content within the computing environment using the predefined internal set of objects plus the newly defined objects to identify any confidential or sensitive information in the content.

Figure 3A:
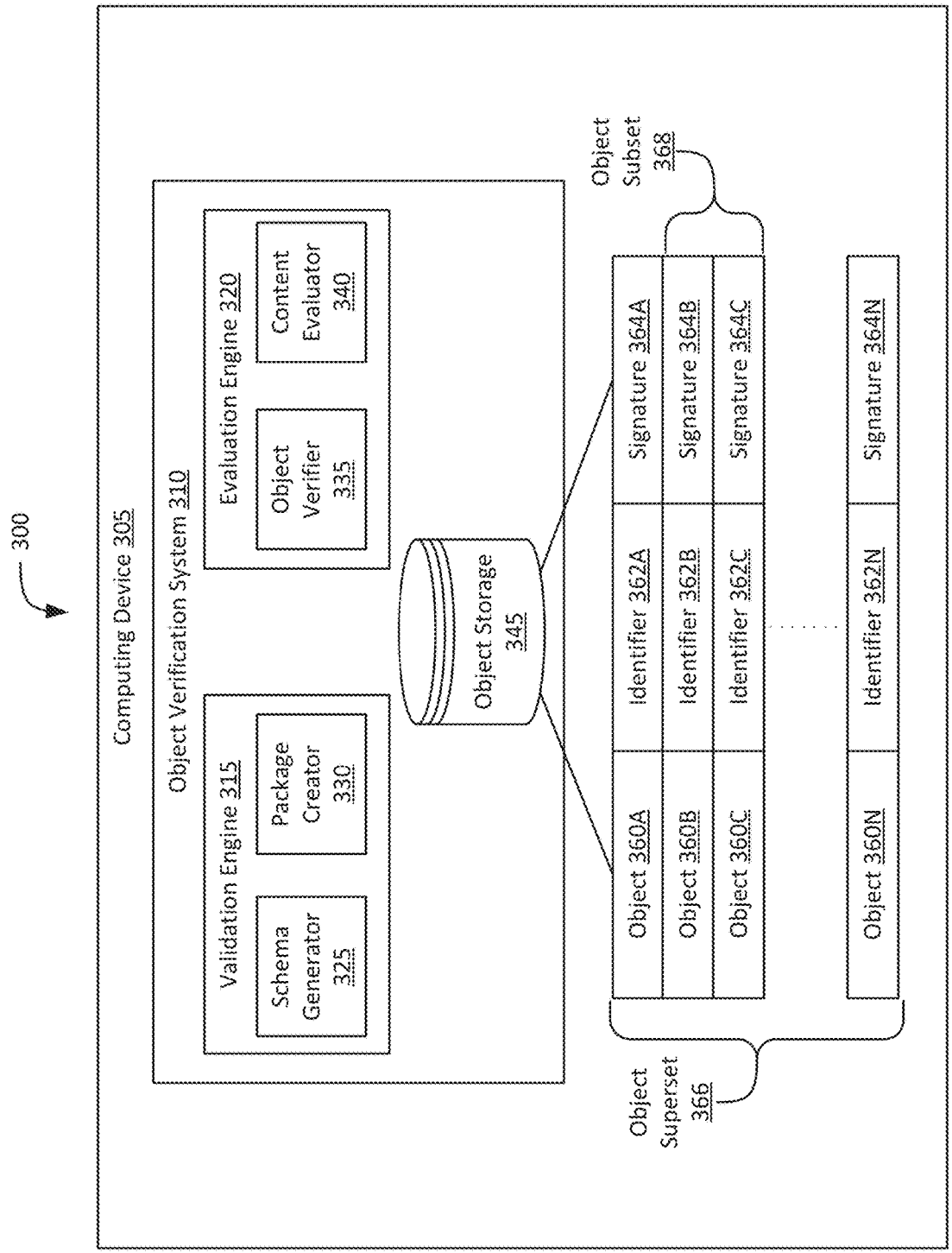
FIG. 3A is a block diagram depicting an example embodiment of a system for defining and securely sharing objects for use in preventing data breach or exfiltration.

Referring now to FIG. 3A, an embodiment of a system 300 for defining and securely sharing objects for use in preventing data breach or exfiltration is depicted. In brief overview, the system 300 may include a computing device 305. The computing device 305 may correspond to one of the client 102 or the one or more servers 106. The computing device 305 may include an object verification system 310. The object verification system 310 may include a validation engine 315, an evaluation engine 320, and/or an object storage 345. The validation engine 315 may include a schema generator 325 and an package creator 330. The evaluation engine 320 may include an object verifier 335 and a content evaluator 340.

Each of the above-mentioned elements or entities (e.g., the object verification system 310, the validation engine 315, the evaluation engine 320, and the object storage 345 and its components) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

The schema generator 325 of the validation engine 315 may validate the set of objects 360A-N (hereinafter sometimes generally referred to as object 360) for use in preventing data breach or exfiltration. The set of objects 360 may correspond to a set of predefined definitions for identifying confidential or sensitive information in content, provided as default with a development platform (e.g., software development kit) being deployed at a client system. The set of objects 360 may be defined by an administrator of the development platform, and may be maintained in the object storage 345. Each object 360 may include or may correspond to a variable, a data structure, a function, and/or a class definition for use in the development platform. Each object 360 may include a pattern, a term, a dictionary of words or phrases, an entity definition, a classifier, or any other structure used to identify confidential or sensitive information in content as detailed previously in Section B. The pattern may include a template for a set of characters. The term may include a specific string of characters. The dictionary of words or phrases may include a string of characters corresponding to a word or a phrase as specified in a list of entries. The entity definition may specify a content type and one or more regular expressions associated with the content type, and may correspond to the entity definition 265 as described in Section B. The classifier may include one or more descriptive terms for a personal identifier type.

To validate the set of objects 360 for use in preventing data breach or exfiltration, the schema generator 325 may determine whether each object 360 is well-formed. In determining whether the object 360 is well-formed, the schema generator 325 may identify the pattern, the term, the dictionary of words or phrases, the entity definition, and/or the classifier of the object 360. The schema generator 325 may compare the identified the pattern, the term, the dictionary of words or phrases, the entity definition, and/or the classifier to one or more syntax rules. The one or more syntax rules may specify a formal template for a well-formed pattern, term, dictionary of words or phrases, entity definition, and/or classifier. If the object 360 is determined not to comply with the one or more syntax rules, the schema generator 325 may determine that the corresponding object 360 is not to be validated. On the other hand, if the object 360 is determined to comply with the one or more syntax rules, the schema generator 325 may determine that the corresponding object 360 can be validated. The objects 360 determined to be validated may form a superset 366. In some embodiments, the schema generator 325 may incorporate an indicator into the objects 360 that belong to the superset 366. The indicator may also be stored in the object storage 345.

With the validation of at least some of the objects 360, the schema generator 325 may create a predefined schema for the set of objects 360. The predefined schema for the set of objects 360 may be later used to verify whether the objects 360 have been tampered or altered by an end user. In creating the predefined schema for each object 360, the schema generator 325 may generate an object identifier 362a-n (hereinafter generally referred to as object identifier 362). The object identifier 362 may include a set of alphanumeric characters associated with the object 360. The schema generator 325 may also generate a signature 364a-n (hereinafter generally referred to as signature 364) for each object 360. The signature 364 may include one or more specifications for the object 360, such as inputs, outputs, parameter definitions, and/or other metadata for the variable, data structure, function, or class definition corresponding to the object 360. The inputs, outputs, and parameter definitions may specify a datatype and a range of values for using the object 360. In some embodiments, the signature 364 may correspond to a most recent update made to the object 360. The most recent update may include a version identifier (e.g., version number or code name) included in the metadata for the object 360. For the object 360, the schema generator 325 may further generate a status. The status may correspond to a development stage of the object 360 in the development platform. The status of the object 360 may include an indication of: whether the respective object is ready to be published for usage, whether the respective object is still in development, whether the respective object is deprecated, whether the respective object can be visible in a user interface, whether the status is for internal use, and/or whether the status is for external use or can be published.

Having generated the object identifier 362, the signature 364, and/or the status for the object 360, the schema generator 325 may incorporate the predefined schema into the corresponding objects 360. The schema generator 325 may incorporate or include the object identifier 362, the signature 364, and/or the status into the predefined schema or with the object 360 (e.g., for deployment). In some embodiments, the schema generator 325 may add or insert the predefined schema into the database 345 maintaining the objects 360. In some embodiments, the predefined schema for one object 360 may differ from the predefined schema from another object 360. In some embodiments, the object identifier 362, the signature 364, and/or the status for one object 360 may differ from the object identifier 362, the signature 364, and/or the status of another object 360.

From the validated superset 366 of objects 360, the package creator 330 of the validation engine 315 may generate a subset 368 of objects (e.g., objects 360B and 360C as depicted in FIG. 3A). The subset 368 may include those objects to be made available for use by the end user of the development platform for identifying classified or sensitive information in content. The package creator 330 may select the subset 335 from the validated superset 366 of objects 360 based on the respective identifiers 362, signatures 364, and/or statuses. In some embodiments, the package creator 330 may traverse or scan the validated superset 366 of objects to identify the identifier 362, the signature 364, and/or the status for the object 360. The package creator 330 may compare the identifier 362, the signature 364, and/or the status for the object 360 with a predefined condition for allowing the object 360 to be public or otherwise accessible for use in the development platform. If the identifier 362, the signature 364, and/or the status for the object 360 is determined to match the predefined condition, the package creator 330 may include the corresponding object 360 as part of the subset 368. Otherwise, if the identifier 362, the signature 364, and/or the status for the object 360 is determined to not match the predefined condition, the package creator 330 may exclude the object 360 from the subset 368. In some embodiments, the package creator 330 may generate a separate copy of the objects 360 belonging to the subset 368.

Once the subset 368 is generated, the package creator 330 may store the objects 360 as the superset 366 corresponding to the subset 368. In some embodiments, the package creator 330 may incorporate an indicator into one or more of the objects 360 that belong to the subset 368. The indicator may be also stored in the object storage 345. The package creator 330 may remove or hide (e.g., render non-visible, non-readable, or inaccessible) at least a portion of the objects 360 to be included in the subset 368. For example, the package creator 330 may remove or hide the inputs, outputs, parameter definitions, and/or other metadata for the variable, data structure, function, or class definition corresponding to the object 360. The package creator 330 may provide the subset 368 of objects 360 to another computing device (e.g., the client 102) for use by the end user of the development platform in preventing data breach or exfiltration. The objects 360 of the subset 368 may have at least the portion removed (e.g., the metadata).

In this manner, objects 360 belonging to the superset 366 but not the subset 368 may be hidden from end users of the development platform. In addition, certain information of those objects 360 even belonging to the subset 368 may be hidden from the end user of the development platform. Such information may include internal implementation (e.g., data structures, definitions, rules) of an object. The end user of the development platform may use the objects 360 in the subset 368 to create additional objects for new patterns, terms, dictionary of words or phrases, entity definitions, and/or classifiers to identify confidential or sensitive information in the content. In doing so, the end user may unintentionally or intentionally alter the objects 360 of the subset 368. In order to test or replicate certain issues/scenarios, a deployed subset 368 of objects 360 may be received from the end user (e.g., from the client 102 or client system) at the objection verification system 110. In some embodiments, particular content may be received with the subset 368 to be evaluated.

To check for tampering or otherwise altering of the objects by the end user, the object verifier 335 of the evaluation engine 320 may identify the one or more object identifiers 362, signatures 364, and/or the statuses for the objects 360 in the subset 368. In some embodiments, the evaluation engine 320 may access the object storage 345 to select and retrieve the superset 366 of objects 360, that corresponds to the particular subset of objects. In some embodiments, the evaluation engine 320 may retrieve the superset 366 of objects 360, in response to receiving the subset 368 of objects 360. From the identified object identifiers 362, signatures 364, and/or the statuses for the objects 360 in the subset 368, the evaluation engine 320 may identify the corresponding identifiers 362, signatures 364, and/or the statuses for the objects 360 in the superset 388. For each object 360 belonging to both the subset 368 and the superset 388, the evaluation engine 320 may check or otherwise compare the identifier 362, signature 364, and/or the status for the object 360 in the subset 368 with the identifier 362, signature 364, and/or the status for the corresponding object 360 in the superset 366. The comparison of the identifier 362, signature 364, and/or the status for the object 360 in the subset 368 with the identifier 362, signature 364, and/or the status for the corresponding object 360 in the super 366 may be on a character-by-character basis.

If any of the identifier 362, signature 364, and/or the status for the object 360 in the subset 368 do not match the identifier 362, signature 364, and/or the status for the corresponding object 360 in the superset 366, the evaluation engine 320 may determine that the object 360 in the subset 368 has been tampered with or otherwise altered. The evaluation engine 320 may also determine that the object 360 in the subset 368 has been tampered with or otherwise altered since the generation of the subset 368. The evaluation engine 320 may further identify which objects 360 in the subset 368 has been tampered or otherwise altered. The evaluation engine 320 may additionally generate a list of all the objects 360 of the subset 368 with the identifiers 362, signatures 364, and/or the statuses not matching those of the objects 360 in the superset 366. Using the list of the objects 360 in the subset 368 not matching those in the superset 366, the evaluation 360 may generate an alert for display or to present to the administrator of the object verification system 310. Conversely, if all of the identifiers 362, signatures 364, and/or the statuses for the objects 360 in the subset 368 match the identifiers 362, signatures 364, and/or the statuses for the corresponding object 360 in the superset 366, the evaluation engine 320 may verify that all the objects 360 in the subset 368 have not been tampered with or altered.

Having verified that none of objects in the subset 368 have been tampered with or otherwise altered, the content evaluator 340 of the evaluation engine 320 may evaluate the content in the computing environment (e.g., the client 102 or the one or more servers 106) using the objects 360 in the superset 366. During evaluation of the content, the evaluation engine 360 may detect an issue or potential issue in the operation of objects of the superset 366. In some embodiments, the evaluation engine 360 may include the functionalities of the entity engine 260 as detailed above in Section B. In some embodiments, the evaluation engine 360 may detect the issue or the potential issue in the operation of new objects 360 defined by the end user of the development platform. To detect the issue or potential issue, the evaluation engine 360 may traverse/scan through the superset of objects 360 to determine whether the pattern, the term, the dictionary of words or phrases, the entity definition, or the classifier of the object 360 appears in the content under evaluation. If the content contains any of the pattern, the term, the dictionary of words or phrases, the entity definition, or the classifier of the object 360, the evaluation engine 360 may detect the issue or potential issue, and may further determine that the content contains sensitive or confidential information. If the content does not contain any of the patterns, the terms, the dictionaries of words or phrases, the entity definitions, or the classifiers of the object 360, the evaluation engine 360 may determine that there is no issue or potential issue in the content under evaluation.

Figure 3B:
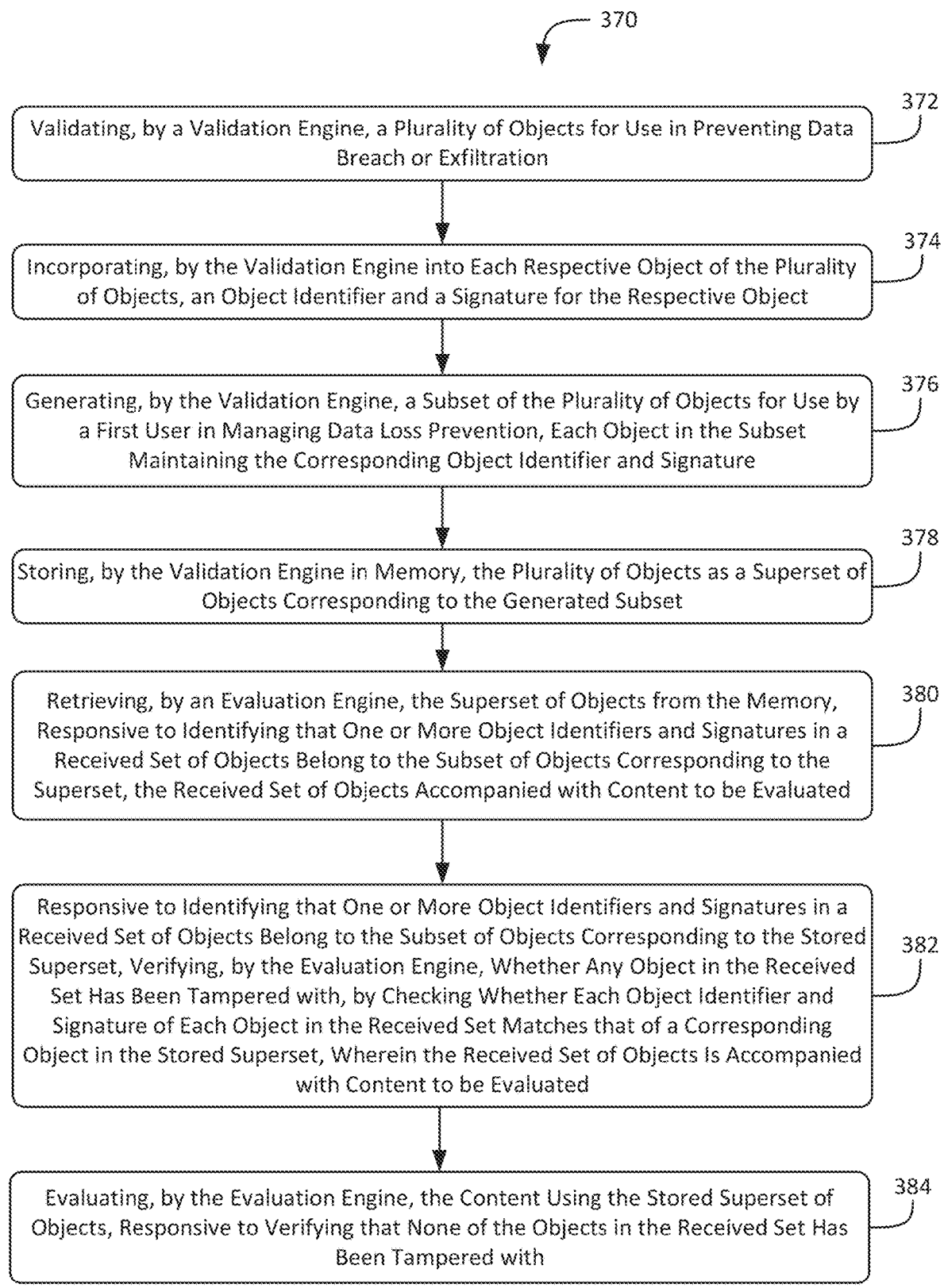
FIG. 3B is a flow diagram depicting an example embodiment of a method of defining and securely sharing objects for use in preventing data breach or exfiltration.

Referring now to FIG. 3B, an embodiment of a method 370 for defining and securely sharing objects for use in preventing data breach or exfiltration is depicted. The method 370 may be performed or executed by any one or more components of system 100 as described in conjunction with FIGS. 1A-1D or system 300 as described in conjunction with FIG. 3A. The method 370 may include validating, by a validation engine executing on one or more processors, a plurality of objects for use in preventing data breach or exfiltration (372). The method 370 may include incorporating, by the validation engine into each respective object of the plurality of objects, an object identifier and a signature for the respective object (374). The method 370 may include generating, by the validation engine, a subset of the plurality of objects for use by a first user in managing data loss prevention (376). The method 370 may include storing, by the validation engine in memory, the plurality of objects as a superset of objects corresponding to the generated subset (378). The method 370 may include retrieving, by an evaluation engine executing on the one or more processors, the superset of objects from the memory, responsive to identifying that one or more object identifiers and signatures in a received set of objects belong to the subset of objects corresponding to the superset (380). The method 370 may include responsive to identifying that one or more object identifiers and signatures in a received set of objects belong to the subset of objects corresponding to the stored superset, verifying, by the evaluation engine, whether any object in the received set has been tampered with by checking whether each object identifier and signature of each object in the received set matches that of a corresponding object in the stored superset (382). The method 370 may include evaluating, by the evaluation engine, the content using the stored superset of objects, responsive to verifying that none of the objects in the received set has been tampered with (384).

Referring to (372), and in further detail, the method 370 may include validating, by a validation engine executing on one or more processors, a plurality of objects for use in preventing data breach or exfiltration. The plurality of objects may correspond to a plurality of predefined definitions for identifying confidential or sensitive information in content to be provided as default with a development platform to the end user. Each object may include or may be presented by a variable, a data structure, a function, and/or a class definition for use in the development platform. Each object include a pattern, a term, a dictionary of words or phrases, an entity definition, a classifier, or any other structure used to identify confidential or sensitive information in the content. The validation engine may validate the plurality of objects for use by checking whether each object in the plurality of objects is well-formed. To determine whether an object is well-formed, the validation engine may compare the object to a syntax rule. The syntax rule may specify a formal template for a well-formed pattern, term, dictionary of words or phrases, entity definition, and/or classifier in the object.

Referring to (374), and in further detail, the method 370 may include incorporating, by the validation engine into each respective object of the plurality of objects, an object identifier and a signature for the respective object. The validation engine may generate an object identifier for each object of the plurality of objects. The object identifier may include a set of alphanumeric characters to uniquely reference the object. The validation engine may also generate a signature for each object of the plurality of objects. The signature may include one or more specifications for the object, such as inputs, outputs, parameter definitions, and other metadata (e.g., version number) for the variable, data structure, function, or class definition corresponding to the object. The validation engine may further generate and incorporate a status for the object. The status may indicate testing data and/or a development stage of the object in the development platform. Having generated the object identifier, the signature, and/or the status for the object, the validation engine may incorporate the predefined schema into the corresponding objects.

Referring to (376), and in further detail, the method 370 may include generating, by the validation engine, a subset of the plurality of objects for use by a first user in managing data loss prevention. The validation engine may generate the subset of objects for delivery to a customer and/or deployment in a particular client system. The validation engine may select a subset of objects from the plurality of objects based on the identifier, the signature, and/or the status for the object. Using the identifier, the signature, and/or the status, the validation engine may determine which objects match a predetermined condition for allowing the respective object for use in the development platform. The validation engine may generate a copy of the objects selected as part of the subset of objects.

Referring to (378), and in further detail, the method 370 may include storing, by the validation engine in memory, the plurality of objects as a superset of objects corresponding to the generated subset. The validation engine may store all the validated objects as a superset of objects corresponding to the subset of objects (e.g., amongst other supersets corresponding to other subsets). The validation engine may incorporate an indicator into the plurality of objects that belong to the subset of objects for use in managing data loss prevention. Additionally, the validation engine may remove or hide at least a portion (e.g., internals, implementation details) of the objects belonging to the subset (e.g., the inputs, outputs, parameter definitions, and other metadata) from the end user of the development platform. The validation engine may provide the subset of the objects to a computing device associated with the end user of the development platform. The subset of objects may be subsequently modified or altered by the end user utilizing the development platform.

Referring to (380), and in further detail, the method 370 may include selecting and/or retrieving, by an evaluation engine executing on the one or more processors, from among a plurality of available supersets, the superset of objects from the memory, responsive to identifying that one or more object identifiers and signatures in a received set of objects belong to the subset of objects corresponding to the superset. For example, a potential issue (e.g., violation of sensitive data policy) in connection with the deployed subset of objects may be detected, and the deployed subset of objects may have to be evaluated for possible deficiencies or update/adjustment. The deployed subset of objects may be received, by copying or extracting from the client system. The received set of objects may be accompanied with relevant content to be evaluated. The evaluation engine may access the memory to retrieve a corresponding superset of objects, from a plurality of supersets maintained in memory or storage. The evaluation engine may identify objects belonging to both the received subset and the superset.

Referring to (382), and in further detail, the method 370 may include: responsive to identifying that one or more object identifiers and signatures in a received set of objects belong to the subset of objects corresponding to the stored superset, verifying, by the evaluation engine, whether any object in the received set has been tampered with (intentionally or inadvertently) by checking whether each object identifier and signature of each object in the received set matches that of a corresponding object in the stored superset. For each object belonging to both the received subset and the stored superset, the evaluation engine may compare the identifiers, the signatures, and the statuses between the respective object in the subset and the superset. If any of the identifiers, the signatures, and the statuses differ between the object of the subset and the object of superset, the evaluation engine may determine that the object has been tampered with or otherwise altered. If all of the identifiers, the signatures, and the statuses differ between all the objects of the subset and all the objects of superset, the evaluation engine may determine that all the objects in the subset have not been tampered.

Referring to (384), and in further detail, the method 370 may include evaluating, by the evaluation engine, the content using the stored superset of objects, responsive to verifying or confirming that none of the objects in the received set has been tampered with or modified. During evaluation of the content, the evaluation engine may detect or identify an issue or potential issue in the operation of the superset (and/or in the operation of the corresponding subset). To detect the issue or potential issue, the evaluation engine may determine whether a relevant sensitive data (e.g., from accompanying received content) can be detected via the use of the superset or a certain object of the superset. For instance, the evaluation engine may determine whether a pattern, a term, a dictionary of words or phrases, an entity definition, and/or a classifier of the object appears in the content under evaluation. If the content contains any of the pattern, the term, the dictionary of words or phrases, the entity definition, or the classifier of the object, the evaluation engine may check or confirm the proper operation of the superset or object, may evaluate, detect or analyze an issue or potential issue, and/or may determine if sensitive or confidential information in the content has been detected. If the content does not have any of the patterns, the terms, the dictionaries of words or phrases, the entity definitions, or the classifiers of all the objects, and the content does not have sensitive or confidential information, the evaluation engine may determine that there is no issue or potential issue in the content or object/superset under evaluation. The evaluation engine may determine if there a false positive or false negative is detected for instance, in comparison with the result obtained at the client system.

The description herein including modules emphasizes the structural independence of the aspects of the system components (e.g., the entity engine and the object verification system), and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system, comprising:
    a computing system having one or more processors coupled with memory, configured to:
        validate a plurality of objects for use in preventing data breach or exfiltration;
        incorporate, into each respective object of the plurality of objects, a corresponding first object identifier and a first signature for the respective object;
        select, for a user, a subset of objects from the plurality of objects, each object in the subset to maintain the corresponding first object identifier and the first signature;
        identify, for an object accompanied by content to be evaluated, a second object identifier and a second signature of the object as belonging to the subset of objects; and
        verify, responsive the identification, whether the object has been tampered with, by comparing the second object identifier and the second signature of the object against the corresponding first object identifier and the first signature of a corresponding object of the plurality of objects.

2. The system of claim 1, wherein the computing system is further configured to determine, responsive to at least one of the second object identifier or the second signature not matching the corresponding first object identifier and the first signature of the corresponding object, that the object has been tampered with.

3. The system of claim 1, wherein the computing system is further configured to determine, responsive to the second object identifier and the second signature matching the corresponding first object identifier and the first signature of the corresponding object, that the object has not been tampered with.

4. The system of claim 1, wherein the computing system is further configured to evaluate, responsive to the verifying that the object has not been tampered with, the content accompanying the object in accordance with definitions of the object.

5. The system of claim 1, wherein the computing system is further configured to detect, from evaluation of the content in accordance with the object, an issue or a potential issue in operation of the plurality of objects.

6. The system of claim 1, wherein the computing system is further configured to incorporate, into each respective object of the plurality of objects, a corresponding status of the respective object, the status indicating a development stage of the respective object.

7. The system of claim 1, wherein the computing system is further configured to verify, responsive the identification, whether the object has been tampered with by comparing a status of the object against a status of a corresponding object of the plurality of objects.

8. The system of claim 1, wherein the computing system is further configured to generate the subset of objects by at least one of: removing at least a portion of an object to be included in the subset; or hiding at least the portion of the object to be included in the subset.

9. The system of claim 1, wherein the computing system is further configured to validate the plurality of objects for use, by determining that each object in the plurality of objects is well-formed in accordance with a syntax rule.

10. The system of claim 1, wherein each object of the plurality of objects comprises a pattern, a term, a dictionary of words or phrases, an entity definition, or a classifier to be compared against the content.

11. A method, comprising:
    validating, by a computing system, a plurality of objects for use in preventing data breach or exfiltration;
    incorporating, by the computing system, into each respective object of the plurality of objects, a corresponding first object identifier and a first signature for the respective object;
    selecting, by the computing system, for a user, a subset of objects from the plurality of objects, each object in the subset to maintain the corresponding first object identifier and the first signature;
    identifying, by the computing system, for an object accompanied by content to be evaluated, a second object identifier and a second signature of the object as belonging to the subset of objects; and
    verifying, by the computing system, responsive the identification, whether the object has been tampered with by comparing the second object identifier and the second signature of the object against the corresponding first object identifier and the first signature of a corresponding object of the plurality of objects.

12. The method of claim 11, further comprising determining, by the computing system, responsive to at least one of the second object identifier or the second signature not matching the corresponding first object identifier and the first signature of the corresponding object, that the object has been tampered with.

13. The method of claim 11, further comprising determining, by the computing system, responsive to the second object identifier and the second signature matching the corresponding first object identifier and the first signature of the corresponding object, that the object has not been tampered with.

14. The method of claim 11, further comprising evaluating, by the computing system, responsive to the verifying that the object has not been tampered with, the content accompanying the object in accordance with definitions of the object.

15. The method of claim 11, further comprising detecting, by the computing system, from evaluation of the content in accordance with the object, an issue or a potential issue in operation of the plurality of objects.

16. The method of claim 11, wherein incorporating further comprises incorporating, into each respective object of the plurality of objects, a corresponding status of the respective object, the status indicating a development stage of the respective object.

17. The method of claim 11, wherein verifying further comprising verifying, responsive the identification, whether the object has been tampered with by comparing a status of the object against a status of a corresponding object of the plurality of objects.

18. The method of claim 11, wherein selecting further comprises generating the subset of objects by at least one of: removing at least a portion of an object to be included in the subset; or hiding at least the portion of the object to be included in the subset.

19. The method of claim 11, wherein validating the plurality of objects for use further comprises determining that each object in the plurality of objects i swell-formed in accordance with a syntax rule.

20. The method of claim 11, wherein each object of the plurality of objects comprises a pattern, a term, a dictionary of words or phrases, an entity definition, or a classifier to be compared against the content.

* * * * *